United States Patent
Liu

(10) Patent No.: US 11,551,259 B2
(45) Date of Patent: Jan. 10, 2023

(54) GENERATING AND PROVIDING RETURN OF INCREMENTAL DIGITAL CONTENT USER INTERFACES FOR IMPROVING PERFORMANCE AND EFFICIENCY OF MULTI-CHANNEL DIGITAL CONTENT CAMPAIGNS

(71) Applicant: Adobe Inc., San Jose, CA (US)

(72) Inventor: Lei Liu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 282 days.

(21) Appl. No.: 15/949,453

(22) Filed: Apr. 10, 2018

(65) Prior Publication Data

US 2019/0311399 A1 Oct. 10, 2019

(51) Int. Cl.
*G06Q 30/02* (2012.01)

(52) U.S. Cl.
CPC ..... *G06Q 30/0247* (2013.01); *G06Q 30/0244* (2013.01)

(58) Field of Classification Search
CPC .... G06F 7/588; G06F 16/9535; G06F 3/0484; G06F 11/0769; G06F 16/783; H04L 67/42; H04L 67/02; H04L 65/4084; H04L 67/32; H04L 63/029; H04L 67/06; H04L 67/2838; H04L 67/306; G06Q 30/0241; G06Q 30/02; G06Q 30/0201; G06Q 30/0247; G06Q 30/0269; G06Q 30/0242; G06Q 30/0243; G06Q 30/0244; G06Q 30/0249; G06Q 30/0272; G06Q 30/0273; G06Q 30/0251; G06Q 50/01; G06Q 30/0255; G06Q 30/0276; G06Q 30/0275; G06Q 30/0246; G06Q 30/0261; G06Q 30/0207–0277; H04N 21/812; H04N 21/2668; H04N 21/25883; H04N 21/4622; G06N 20/00
See application file for complete search history.

(56) References Cited

U.S. PATENT DOCUMENTS

2008/0288306 A1\* 11/2008 MacIntyre ......... G06Q 10/0637
705/7.29
2012/0084141 A1\* 4/2012 Quinn ................ G06Q 30/0244
705/14.43

(Continued)

*Primary Examiner* — Chinyere Mpamugo
(74) *Attorney, Agent, or Firm* — Keller Preece PLLC

(57) ABSTRACT

The present disclosure includes systems, methods, and non-transitory computer readable media that generate and provide return of incremental digital content user interfaces that improve performance and efficiency of multi-channel, multi-region digital content campaigns. In particular, one or more embodiments generate and provide a user interface that comprises a return of incremental digital content expenditure regression curve and return of incremental digital content expenditure point representations that accurately and intuitively detail digital content campaign expenditure efficiency for combinations of channels and regions during multiple time periods in a time window. For example, the resulting return of incremental digital content expenditure user interface effectively utilizes limited computing device display space and resources to enable a publisher to quickly and accurately optimize and project high level expenditure allocation in order to improve digital content campaigns.

20 Claims, 11 Drawing Sheets

(56) References Cited

U.S. PATENT DOCUMENTS

| | | | | |
|---|---|---|---|---|
| 2013/0021345 A1* | 1/2013 | Hsiao | ............... | G06Q 30/0241 345/440.2 |
| 2013/0263181 A1* | 10/2013 | Impollonia | ......... | H04N 21/251 725/32 |
| 2015/0317670 A1* | 11/2015 | Cavander | .......... | G06Q 30/0242 705/14.41 |

* cited by examiner

GENERATING AND PROVIDING RETURN OF INCREMENTAL DIGITAL CONTENT USER INTERFACES FOR IMPROVING PERFORMANCE AND EFFICIENCY OF MULTI-CHANNEL DIGITAL CONTENT CAMPAIGNS

BACKGROUND

Developers have achieved significant improvements in digital content campaign systems that provide digital content to users of client devices across multiple digital channels. For example, in response to receiving digital content campaign parameters from publishers, convention systems can provide personalized digital content including digital assets to a client computing device of a targeted user. Moreover, conventional systems can generate and provide analysis tools in association with information related to digital content campaigns such that publishers can attempt to quantify the efficacy of the digital content campaigns.

Although conventional digital content campaign systems provide analysis tools associated with digital content campaign information, these systems have a number of shortcomings. For example, conventional digital content campaign systems provide inefficient user interfaces for navigating digital information related to digital content campaigns. To illustrate, conventional digital content campaign systems provide overwhelming amounts of digital analytics information regarding digital content campaigns through various user interfaces (e.g., performance versus predefined target chart interfaces, unit versus spend curve interface elements, revenue versus spend curve interfaces, or overall campaign revenue over time elements). Conventional digital content campaign systems often require users of computing devices to scroll through and switch views many times to find pertinent information with regard to efficiency of content campaigns. Because computing devices can only display a limited amount of information via a display screen, conventional digital content systems divide data and functionality into many layers or views in different user interfaces. This leads to user interfaces that are slow, complex and difficult to learn—particularly for inexperienced users.

In addition, conventional digital content campaign systems often utilize significant computing resources. Indeed, because publisher client devices navigate through a myriad of different user interfaces to identify pertinent digital information, conventional digital content campaign systems often result in repeatedly generating visualization and optimization tools through a variety of different user interfaces as publishers seek to tease out pertinent information. Accordingly, conventional digital content campaign systems often waste system resources and publisher time.

Additionally, conventional digital content campaign systems lack accuracy and flexibility. For instance, conventional systems often determine annual recurring revenue and implement digital content campaigns using static, pre-calculated, and aggregated values that fail to accurately or flexibly account for varying driving factors across different channels and regions. Moreover, utilizing generic analysis and display tools from conventional digital content campaign systems, publishers often misinterpret analysis results and execute inaccurate and non-optimized digital content campaigns. For example, utilizing analytics tools provided by conventional systems, publishers often select digital content campaign parameters that lead to inefficiently providing digital content to incorrectly targeted users of client computing devices. Accordingly, the inaccuracies of conventional digital content campaign systems further contribute to wasted resources by both publisher and client computing systems.

BRIEF SUMMARY

One or more embodiments of the present disclosure provide benefits and/or solve one or more of the foregoing or other problems in the art with systems, methods, and non-transitory computer readable storage media that generate and provide a return of incremental digital content user interface that improves the performance and efficiency of digital content campaigns across multiple channels and regions. Specifically, in one or more embodiments, the disclosed systems utilize a multi-channel attribution model to analyze digital content campaigns and determine return of incremental digital content expenditure values (e.g., return of marketing spend values) specific to particular channels and/or regions. Moreover, the disclosed systems can generate a user interface that comprises a return of incremental digital content expenditure regression curve. The resulting return of incremental digital content expenditure user interface provides a tool that improves evaluation and projection of digital content campaign performance. Accordingly, the disclosed systems can assist in more quickly, accurately, and efficiently implementing improved campaign parameters (e.g., expenditure allocation) for digital content campaigns across channels and regions.

Additional features and advantages of one or more embodiments of the present disclosure will be set forth in the description that follows, and in part will be obvious from the description, or may be learned by practice of such example embodiments.

BRIEF DESCRIPTION OF THE DRAWINGS

The detailed description is described with reference to the accompanying drawings in which.

DETAILED DESCRIPTION

Figure 1:
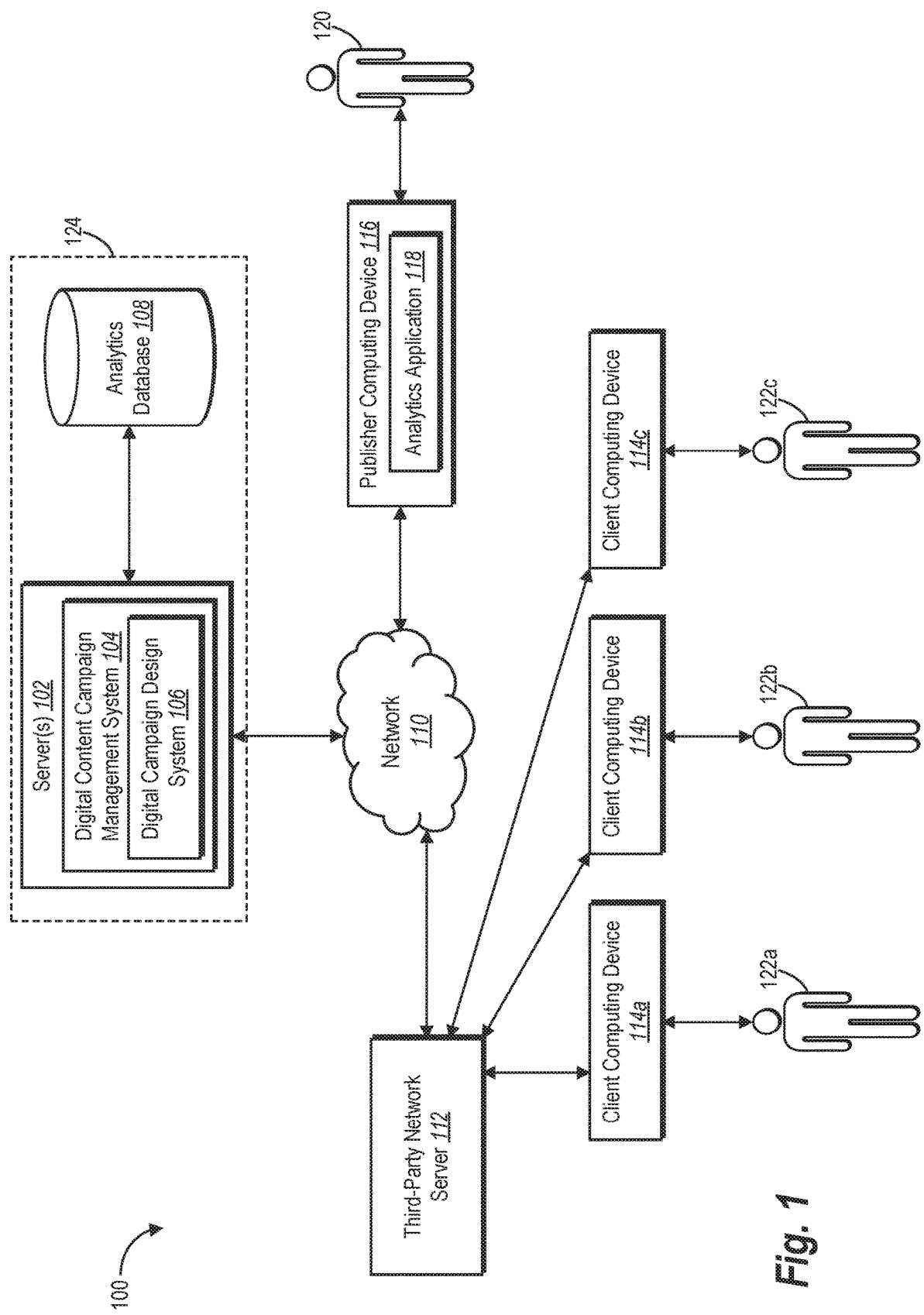
FIG. 1 illustrates an example environment in which a digital campaign design system operates in accordance with one or more embodiments.

One or more embodiments of the present disclosure include a digital campaign design system that efficiently and accurately analyzes historical campaign performance to generate a return of incremental digital content user interface for improving the performance and efficiency of digital content campaigns across multiple channels and regions. In particular, in one or more embodiments, the digital campaign design system utilizes a multichannel attribution model to efficiently analyze digital content campaigns for multiple channels and regions. Utilizing attribution scores for region-channel specific campaign values, the digital campaign design system can determine return of incremental digital content expenditure values for individual time periods and generate an intuitive user interface that includes a return of incremental digital content expenditure regression curve. Utilizing the return of incremental digital content expenditure regression curve (and corresponding point representations), the digital campaign design system can assist in identifying and implementing improved digital content campaigns. For example, the digital campaign design system can efficiently and accurately indicate relative performance of ongoing digital content campaigns, predict performance of future digital content campaigns, compare performance between alternative campaigns, and identify more optimal allocations between campaigns.

To illustrate, in one or more embodiments, the digital campaign design system identifies expenditures and revenue for a digital content campaign for time periods in a time window (e.g., weeks over multiple yearly quarters). The digital campaign design system can then utilize the identified expenditure and revenue information to determine return of incremental digital content expenditure values for each time period. In at least one embodiment, the digital campaign design system generates a user interface for display to a publisher device illustrating the determined return of incremental digital content expenditure values over time. For example, the digital campaign design system can generate the user interface by generating a return of incremental digital content expenditure regression curve as part of a graph. The digital campaign design system can further generate return of incremental digital content expenditure point representations associated with each return of incremental digital content expenditure value for inclusion in the graph. The resulting user interface including the graph effectively illustrates expenditure efficiency associated with the digital content campaign over time for selection and modification of digital content campaign parameters.

As just mentioned, in order to determine incremental digital content expenditure values, the digital campaign design system can determine expenditures and revenue. In particular, the digital campaign system can determine expenditures and revenues for time periods in a time window from historical digital content campaign information. For example, the digital campaign design system can determine expenditures and revenue associated with conversions corresponding to a plurality of distribution channels and regions.

Because user computing devices can interact with multiple channels (through multiple touchpoints), the digital campaign design system can also accurately attribute a revenue value to individual channels (or touchpoints). For instance, in one or more embodiments, the digital campaign design system determines revenue associated with one or more digital content campaigns by utilizing an attribution model. To illustrate, the digital campaign design system can utilize an attribution model to determine an attribution score for each touchpoint of a converted user during a particular time period within the time window.

Utilizing attribution scores, the digital campaign design system can determine accurate channel-region revenue amounts attributable to individual channels for a particular region. To illustrate, in response to determining that a user interaction (e.g., a touchpoint) through a particular channel in a particular region resulted in a conversion, the digital campaign design system determines a revenue amount corresponding to the conversion. In at least one embodiment, the digital campaign design system can then determine an accurate channel-region revenue by applying the attribution score to the revenue amount.

Additionally, as mentioned above, the digital campaign design system can determine return of incremental digital content expenditure values. For example, in one or more embodiments, the digital campaign design system determines the return of incremental digital content expenditure values for a digital content campaign based on channel-region revenues and corresponding expenditures. To illustrate, in at least one embodiment, the digital campaign design system determines the return of incremental digital content expenditure value as the difference between expenditure associated with a particular channel and region and the channel-region revenue attributable to the channel and region per unit of expenditure.

As mentioned, the digital campaign design system can also generate an intuitive user interface for display based on incremental digital content expenditure values. For example, the digital campaign design system can generate a user interface including a graph with expenditure plotted on the x-axis and return of incremental digital content expenditure value plotted on the y-axis. Moreover, in one or more embodiments the digital campaign design system generates a return of incremental digital content expenditure regression curve within the graph. For example, the digital campaign design system can apply a regression algorithm to the incremental digital content expenditure values to generate an incremental digital content expenditure regression curve.

The digital campaign design system can also include additional interface elements to efficiently portray performance for one or more digital content campaigns. For example, in one or more embodiments, the digital campaign design system generates a return of incremental digital content expenditure point representation for each determined return of incremental digital content expenditure value plotted in the graph. Moreover, in one or more embodiments, the digital campaign design system can add additional visual signals (e.g., color, shape) to the return of incremental digital content expenditure point representations to delineate time periods associated with each return of incremental digital content expenditure point representation.

Furthermore, as mentioned above, the digital campaign design system can generate the user interface for interactive display to a publisher computing device. In one or more embodiments, in response to user interaction (e.g., a touch gesture or hovering) with a point representation, the digital campaign design system generates additional elements for displaying information associated with return of incremental digital content expenditure values.

In one or more embodiments, the digital campaign design system can analyze different levels of granularity to compare expenditure efficiency across regions and/or channels. For example, by grouping expenditure and revenue data by region, the digital campaign design system can generate separate graphs for different regions (or channels) within the same user interface. The resulting user interface intuitively illustrates how the return of incremental digital content expenditure values compare between regions and how to efficiently maximize expenditures across multiple regions (or channels).

Similarly, in one or more embodiments, the digital campaign design system assists in optimizing expenditure allocations across separate digital content campaigns. For example, the digital campaign design system can generate a combined return of incremental digital content expenditure curve for different expenditure allocations across digital content campaigns. The resulting combination quickly and easily illustrates the optimized expenditure split between the digital content campaigns.

As mentioned, the digital campaign design system provides a number of advantages over conventional systems. For example, the digital campaign design system can provide a user interface that accurately and intuitively illustrates digital content campaign expenditure efficiency over time and that efficiently utilizes limited display space associated with a computing device. For instance, as just described, the digital campaign design system can generate a user interface that includes a return of incremental digital content expenditure curve, individual return of incremental digital content expenditure point representations (with shape and color differentiating different time periods), and interactive elements that provide additional information in response to intuitive user interaction (e.g., hovering) over the point representations. Thus, the digital campaign design system can provide a streamlined analytical solution for users at any experience level.

Additionally, the digital campaign design system improves efficiency. For example, by providing a user interface specific to digital content campaign expenditure efficiency, the digital campaign design system efficiently utilizes system resources. For instance, utilizing the digital campaign design system, publishers need not navigate through multiple user interfaces in order to attempt complex analytic tasks. Instead, the digital campaign design system can provide a single, easy to understand user interface that enables rapid expenditure efficiency analysis and projection.

Furthermore, the digital campaign design system improves digital content campaign efficiency. For example, publishers can quickly understand and project insights from the user interface provided by the digital campaign design system to digital content campaign expenditure maneuvers. In particular, the digital campaign design system can efficiently and accurately indicate relative performance of ongoing digital content campaigns, predict performance of future digital content campaigns, compare performance between alternative campaigns, and identify more optimal allocations between campaigns. Thus, the digital campaign design system cuts unnecessary waste of system resources and publisher time and ultimately results in delivering digital content to client devices through more optimized digital content campaigns.

Moreover, the digital campaign design system improves accuracy. For example, the digital campaign design system provides a single user interface tailored to optimizing digital content campaign expenditures. Thus, the digital campaign design system bypasses the need for a myriad of user interfaces and rather provides an accurate display of expenditure efficiency. Moreover, as mentioned, the digital campaign design system can generate return of incremental digital content expenditure values based on accurate, dynamic region-channel revenue values adjusted for attribution in relation to different touchpoints corresponding to different channels. Thus, the digital campaign design system flexibly and accurately provides user interfaces for analyzing and projecting digital content campaign performance.

As illustrated by the foregoing discussion, the present disclosure utilizes a variety of terms to describe features and advantages of the digital campaign design system. Additional detail is now provided regarding the meaning of such terms. For example, as used herein, the term "digital content campaign" refers to actions, rules, and/or processes for disseminating digital content items. In particular, a digital content campaign includes one or more content items (e.g., advertisements) and one or more campaign parameters (e.g., budget allocation, duration, bidding parameters, target channels, target regions, or target user characteristics) for disseminating the one or more digital content items to client computing devices.

As used herein, a "publisher" refers to a user who provides digital content items for a digital content campaign. In particular, a publisher includes an individual or entity that provides digital content for a digital content campaign and selects one or more campaign parameters for disseminating the digital content items to client computing devices. For example, a publisher can configure campaign parameters that dictate one or more channels and regions in which digital content items should be disseminated during a digital content campaign. Additional campaign parameters may include time periods in a time window during which the digital content campaign should run, target characteristics of user to whom digital items should be provided, and expenditure caps associated with the digital content campaign.

As used herein, a "channel" refers to an avenue (or category) for delivering digital content. In particular, a channel includes a digital outlet through which digital content items are delivered as part of a digital content campaign. For example, a channel can include, but is not limited to display on a website (e.g., an advertising slot in a website), paid search (e.g., insertion into search results of a search engine), e-mail messaging, push notification, chat/text messaging, or mobile application (e.g., a social media application). A single digital content campaign can include campaign parameters that dictate dissemination of digital content items via one or more channels.

As used herein, a "region" refers to a geographical area. In particular, a region includes a geographical area over which digital content items are disseminated as part of a digital content campaign. For example, a region may include a geographical area defined by a zip code, a state, a country, or GPS coordinates. A region may be specified as part of campaign parameters of a digital content campaign. In one or more embodiments, digital content campaign parameters may dictate one or more regions.

As used herein, a "touchpoint" refers to an interaction between a user and digital content. In particular, a "touchpoint" includes a user interaction (e.g., view, click, hover, or purchase) by a client computing device of a targeted user and a digital content item disseminated as part of a digital content campaign. A touchpoint can include, for example, a display impression, an email open, an email view, or a link click. To illustrate, the digital campaign design system may determine that a user located in the U.S. viewed a digital content item of a digital content campaign as the result of a keyword search via a search website. Accordingly, the digital campaign design system determines the viewing of that digital content item to be a touchpoint, while the user's location (e.g., U.S.) is the region associated with the touchpoint and the search website is the channel associated with the touchpoint.

As used herein, a "conversion" refers to a monitored to act, event, or behavior of a user. In particular, the term conversion includes an act, event, or behavior monitored (and desired) by a publisher (or administrator). For example, a conversion may include, but is not limited to, a click, a page land, a purchase, a subscription (e.g., signing up for a trial subscription of digital content), video view, and so forth. It follows that a "converted user" is a targeted user associated with a digital content campaign that engages in activity corresponding to a conversion. A converted user may engage with more than one touchpoint of a digital content campaign prior to a conversion. Thus, a "touchpoint of a converted user" refers to a touchpoint of a user that eventually leads to a conversion.

As used herein, "expenditures" refer to an amount of resources (e.g., money) expended in connection with a digital content campaign. For example, if digital content campaign parameters specify dissemination of digital content items via a paid search channel, the expenditures associated with the digital content campaign include the amount of money paid by the publisher to facilitate the paid search result. The digital campaign design system can utilize various levels of expenditures associated with a digital content campaign. For example, the digital campaign design system can utilize expenditures associated with a single time period during a time window. Furthermore, the digital campaign design system can utilize expenditures associated with a channel and region combination and time period during a time window.

As used herein, "revenue" refers to value or gain (e.g., financial gain) associated with a digital content campaign. In particular, revenue includes gain resulting from a conversion in a digital content campaign. For example, if a user of a client device purchases a product after receiving a digital content item as part of a digital content campaign, revenue would include the gain resulting from the purchase. In one or more embodiments, the digital campaign design system utilizes different levels of revenue in determining return of incremental digital content expenditure values. For example, as used herein, "channel-region revenue" refers to revenue attributable to a channel (or touchpoint) of a converted user in a particular region (during a particular time period). Additionally, as used herein, "total channel-region revenue" refers to revenue attributable to a plurality of (e.g., all) converted users corresponding to a channel and region combination (during a particular time period).

As used herein, a "time period" refers to a measured amount of time that occurs during a time window. As used herein, a "time window" refers to a total amount of time that is divided into time periods. For example, a digital content campaign may occur over many weeks (e.g., time periods) over a calendar year (e.g., a time window).

As used herein, a "return of incremental digital content expenditure value" refers to a value that reflects digital content campaign expenditure efficiency (e.g., for one or more channels and/or regions). In particular, return of incremental digital content expenditure value includes incremental return on expenditure (e.g., the difference between expenditure and revenue) per unit of expenditure (e.g., divided by expenditure). For example, return of incremental digital content expenditure values include the expenditure associated with a particular channel and region subtracted from the channel-region revenue attributable to the channel and region, divided by the expenditure.

As mentioned, in one or more embodiments, the digital campaign design system generates a return of incremental digital content expenditure regression curve and/or return of incremental digital content expenditure point representations. As used herein, a "return of incremental digital content expenditure regression curve" refers to a regression curve (e.g., a best fit curve) that indicates return of incremental digital content values in relation to different expenditures. Similarly, "return of incremental digital content expenditure point representation" refers to a point on a graph indicating an incremental digital content expenditure value for a particular expenditure (for a particular period of time). The digital campaign design system can configure the color and shape of a return of incremental digital content expenditure point representation to reflect additional information corresponding to the underlying return of incremental digital content expenditure value (e.g., the associated time period, the associated channel, the associated region). Additional detail regarding incremental digital content expenditure regression curves and point representations is provided below (e.g., in relation to FIGS. 4-7).

As used herein, an "attribution model" refers to a computer-implemented procedure or algorithm that receives inputs and generates an attribution score associated with a touchpoint of a converted user. As used herein, an "attribution score" represents a value (e.g., a percentage or other portion) of a total revenue amount associated with a conversion that is attributable to a single touchpoint of a converted user. To illustrate, if a digital content campaign conversion is the sale of a $10 item, and a targeted user has three touchpoints with digital content items of a digital content campaign prior to purchasing the $10 item, the attribution model may determine that the attribution scores of the three touchpoints are 0.1, 0.4, and 0.5, respectively Thus, the revenue attributable to each touchpoint based on the conversion is $1, $4, and $5, respectively.

In alternative embodiments, the attribution model may not output attribution scores that add up to one for touchpoints related to a conversion. For example, it is possible that the various channels associated with a digital content campaign may not be wholly responsible for a given conversion. In other words, in at least one embodiment, the attribution model determines that a converted user has other knowledge or contact with a product or service prior (or in addition) to encountering digital content items associated with the product or service as part of a digital content campaign. In that case, the attribution model may determine that the attribution scores of various touchpoints of a converted user are 0.1, 0.2, and 0.1, respectively.

In one or more embodiments, the digital campaign design system trains the attribution model utilizing historical digital content campaign data. For example, the attribution model can be a machine-learning model (e.g., a neural network, deep learning model, linear regression model, decision tree) with parameters that can be tuned based on historical performance data to approximate unknown functions and generate an attribution score. In one or more embodiments, the digital campaign design system trains the attribution model against historical attribution scores (e.g., via feed-forward back-propagation, or any other machine model training technique) such that the attribution model can generate an attribution score in response to a specified channel (or touchpoint). Additional detail regarding the attribution model is provided below (e.g., in relation to FIGS. 2-4).

Additional detail regarding the digital campaign design system will now be provided in relation to illustrative figures. For example, FIG. 1 illustrates an example environment 100 in which a digital campaign design system 106 can operate. For example, as shown in FIG. 1, the environment 100 includes the digital campaign design system 106 operating as part of a digital content campaign management system 104 on the server(s) 102 associated with the analytics database 108. Additionally, the environment 100 includes the network 110 that connects the third-party network server 112, the client computing devices 114a, 114b, and 114c, and the publisher computing device 116. Additional information regarding the network 110 is provided below in reference to FIG. 10.

Any of the client computing devices 114a-114c and the publisher computing device 116 may include a computing device such as a desktop computer, a notebook or laptop computer, a netbook, a tablet computer, an e-book reader, a GPS device, a camera, a personal digital assistant (PDA), a handheld electronic device, a cellular telephone, a smartphone, other suitable electronic device, or any suitable combination thereof (as described in greater detail below in relation to FIG. 10). Moreover, each of the client computing devices 114a-114c and the publisher computing device 116 can access and/or communicate with the server(s) 102 and/or the third-party network server 112.

As shown in FIG. 1, each of the client computing devices 114a-114c is operated by a user 122a, 122b, and 122c, respectively. Similarly, the publisher computing device 116 is operated by a publisher 120. In one or more embodiments, the users 122a-122c are users targeted by the digital content campaign management system 104 to be provided with one or more digital content items as part of a digital content campaign. In one or more embodiments, the publisher 120 is a digital content campaign management system user who configures one or more parameters of the digital content campaign, and who requests (e.g., via the analytics application 118) return of incremental digital content expenditure analysis associated with the digital content campaign from the digital campaign design system 106.

In one or more embodiments, the server(s) 102 may include a variety of servers, sub-systems, programs, modules, logs, and data stores. In particular embodiments, the server(s), the server(s) 102 may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. Additional detail regarding the server(s) 102 are provided below (e.g., in relation to FIG. 10).

In one or more embodiments, the third-party network server 112 provides personalized digital content to the client computing devices 114a-114c in response to impression opportunities (e.g., in response to a client computing device accessing a website with an ad slot or opening a mobile application with an advertisement space). For example, in response to identifying a web query including one or more search terms or key words from the client computing device 114a, the third-party network server 112 can provide digital content (e.g., hyperlinks, descriptions, images, videos) associated with the search terms or keywords for display to the client computing device 114a. Additionally, in response to receiving the query, the third-party network server 112 can provide targeted digital content (e.g., sponsored hyperlinks, digital advertisements) from the publisher computing device 116 to the client computing device 114a.

As shown in FIG. 1, the environment 100 also includes the server(s) 102 that include a digital content campaign management system 104. The digital content campaign management system 104 can manage, operate, run, and/or execute a digital content campaign (e.g., in conjunction with the digital campaign design system 106 as shown). For example, the digital content campaign management system 104 can receive digital content items (e.g., an online ad) and campaign parameters (such as bidding parameters, a budget, or a campaign run time) from the publisher computing device 116. The digital content campaign management system 104 (in conjunction with the digital campaign design system 106) can execute the digital content campaign by providing the digital content to the third-party network server 112 in accordance with the campaign parameters.

As shown in FIG. 1, the digital content campaign management system 104 includes the digital campaign design system 106. The digital campaign design system 106 tracks conversions, expenditure, and revenue associated with digital content campaigns over time periods within a time window. Based on this tracked information, the digital campaign design system 106 determines return of incremental digital content expenditure values for each time period that reflect expenditure efficiency for the digital content campaigns during the time window for various combinations of channels and regions. The digital campaign design system 106 communicates this efficiency analysis by generating an interactive user interface for display to the publisher computing device 116 that includes a graph of a return of incremental digital content expenditure regression curve and return of incremental digital content expenditure point representations corresponding to the return of incremental digital content expenditure values.

In one or more embodiments, the components of the digital campaign design system 106 may be located on, or implemented by, one or more computing devices. For example, in some embodiments, the digital campaign design system 106 is implemented as part of the digital content campaign management system 104 on the server(s) 102. Alternatively, the digital campaign design system 106 may be installed as a native application, a web browser plugin, or another type of application plugin (e.g., a social media application plugin) on the publisher computing device 116. Moreover, although FIG. 1 illustrates the server(s) 102 and the third-party network server 112 as separate, they can be implemented in the same set of server devices. For example, in one or more embodiments, the third-party network server 112 is implemented as part of the digital content campaign management system 104 on the server(s) 102.

In one or more embodiments, the digital campaign design system 106 is associated with (e.g., as indicated by the box 124) an analytics database 108. In at least one embodiment, the analytics database 108 stores and maintains tracked digital content campaign data, such as described above. The analytics database 108 may be hosted by the server(s) 102 or may be remotely hosted by one or more additional servers.

As mentioned above, the digital campaign design system 106 determines return of incremental digital content expenditure values for multiple time periods in a time window based on an analysis of expenditures and revenue associated with a digital content campaign for the time periods across various channels and regions. In order to determine expenditures and revenue associated with the digital content campaign over time, the digital campaign design system 106 tracks information associated with the digital content campaign. For example, as shown in FIG. 2, the digital campaign design system 106 tracks information as shown in the data repository 202.

Figure 2:
FIG. 2 illustrates example data associated with a digital content campaign in accordance with one or more embodiments.

In one or more embodiments, as shown in FIG. 2, the digital campaign design system 106 tracks information associated with each touchpoint associated with a converted user (e.g., shown in the rows 206*a*, 206*b*, 206*c*, 206*d*, and 206*e*) in connection with the digital content campaign. For example, for each converted user touchpoint associated with the digital content campaign, the digital campaign design system 106 tracks the information across the columns 204*a*, 204*b*, 204*c*, 204*d*, 204*e*, 204*f*, 204*g*, and 204*h*. For instance, for the converted user touchpoint represented by the information in the row 206*a* in the data repository 202, the digital campaign design system 106 tracks a unique user ID in the column 204*a*, a touchpoint date in the column 204*b*, a conversion date in the column 204*c*, a time period in the column 204*d*, a region in the column 204*e*, a channel in the column 204*f*, an attribution score in the column 204*g*, and a conversion revenue in the column 204*h*.

As illustrated in the data repository 202, a single converted user may interact with multiple touchpoints associated with the digital content campaign over multiple dates prior to a conversion (e.g., making a purchase). As an illustrative example, as shown in the rows 206*a*-206*c*, the user associated with the user ID "AAA" had three touchpoints (e.g., on Jan. 4, Jan. 5, and Jan. 8, 2017), prior to a conversion (e.g., purchasing an item) associated with the digital content campaign on Jan. 9, 2017. As further shown in the data repository 202, the region associated with all three touchpoints is the same (e.g., "US"), while two of the touchpoints are associated with the channel "Display" and one of the touchpoints is associated with the channel "Paid Search." Thus, in one embodiment, the digital content campaign management system 104 provided targeted digital content items associated with the digital content campaign to the user associated with the user ID "AAA" (e.g., via advertisements, as sponsored search engine results) on three occasions via two channels prior to the conversion on Jan. 9, 2017.

In one or more embodiments, the digital campaign design system 106 determines an attribution score (e.g., as shown in the column 204*g* of the data repository 202) associated with each touchpoint of the converted user. For example, as discussed above, the attribution score in the column 204*g* (e.g., 0.1) associated with the touchpoint illustrated in the row 206*a* indicates that ten percent of the total conversion revenue is attributable to the touchpoint represented in the row 206*a*. Similarly, the attribution score in the row 206*b* indicates that twenty percent of the total conversion revenue is attributable to the touch point represented in the row 206*b*, and the attribution score in the row 206*c* indicates that another ten percent of the total conversion revenue is attributable to the touch point represented in the row 206*c*. In one or more embodiments, the digital campaign design system 106 determines an attribution score associated with a touchpoint by utilizing a trained attribution model, as will be described in greater detail below.

Figure 3:
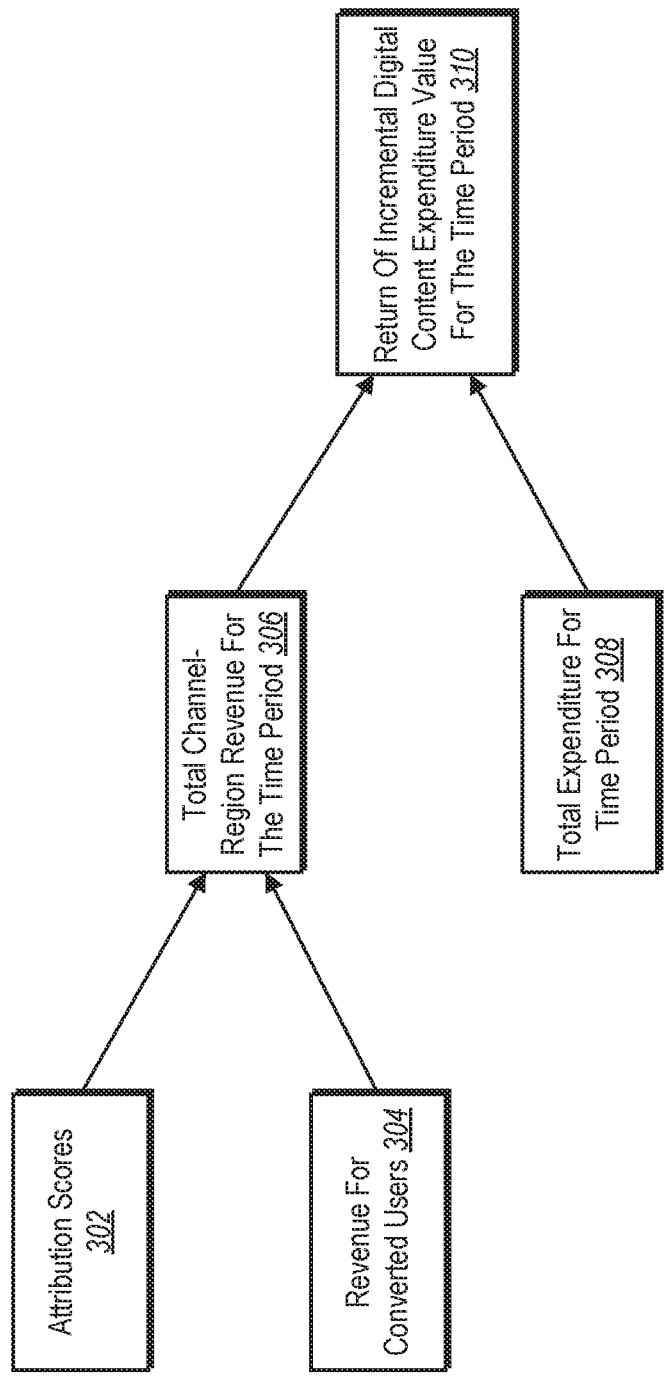
FIG. 3 illustrates determining a return of incremental digital content expenditure value in accordance with one or more embodiments.

FIG. 3 illustrates determining a return of incremental digital content expenditure value associated with a digital content campaign for a time period within a time window in accordance with one or more embodiments. As illustrated, in determining a return of incremental digital content expenditure value for a single time period, the digital campaign design system 106 can perform the act 302 of identifying attribution scores and the act 304 of identifying revenue for the converted users. In particular, the digital campaign design system 106 can identify attribution scores and revenue for the converted users for each touchpoint of converted users associated with the digital content campaign during the time period. For example, in at least one embodiment, the digital campaign design system 106 performs the acts 302 and 304 by identifying the attribution scores in the column 204*g* and the associated conversion revenue values in the column 204*h* in the data repository 202 in relation to each touchpoint of converted users during the time period.

After identifying an attribution score and revenue for each touchpoint of converted users, the digital campaign design system 106 performs the act 306 of determining the total channel-region revenue for the time period. For example, in at least one embodiment, the digital campaign design system 106 determines the total channel-region revenue for the time period by multiplying the attribution score and revenue for each touchpoint of converted users to determine a channel/region revenue value for each converted user. Then, to determine the total channel/region revenue for a particular combination of channel and region represented in the data repository, the digital campaign design system 106 adds together the channel/region revenue values for touchpoints of converted users that include the specified combination of channel and region. Thus, in one or more embodiments, the total channel-region revenue for the time period represents the total financial gain associated with the digital content campaign for channel/region combination during the time period.

In some embodiments, the digital campaign design system 106 determines a total channel-region revenue for a time period based on a revenue for a larger time window. For example, when a conversion results in an annual revenue stream (e.g., an annual return), the digital campaign design system 106 can determine a revenue for a time period (e.g., a week) based on the annual revenue stream (e.g., by dividing the annual return by 52). The digital campaign design system 106 can then multiply an attribution score by the revenue for the time period in generating a total channel-region revenue for the time period. Alternatively, the digital campaign design system 106 may utilize the annual revenue stream (e.g., the annual recurring revenue) as the revenue for the time period. For example, for an annual revenue stream conversion in March (e.g., an annual software subscription purchase in March), the digital campaign design system 106 can attribute the entire annual recurring revenue stream to the month of March. In such embodiments, the digital campaign design system 106 multiplies the attribution score by the annual return to generate the total channel-region revenue for the time period.

As shown in FIG. 3, the digital campaign design system 106 also performs the act 308 of identifying a total expenditure amount for the time period. For example, in at least one embodiment, the digital campaign design system 106 identifies the total expenditure amount as the total amount of expenditures associated with the digital content campaign during the time period. More particularly, the digital campaign design system 106 can identify expenditures for the channel and region within the time period.

Moreover, as illustrated, the digital campaign design system 106 performs the act 310 of determining the return of incremental digital content expenditure value for the time period. For example, in one or more embodiments, the digital campaign design system 106 determines the return of incremental digital content expenditure value for the time period based on the total channel-region revenue for the time period (e.g., determined in the act 306) and the total expenditure amount for the time period (e.g., determined in the act 308). In at least one embodiment, the digital campaign design system 106 determines the return of incremental digital content expenditure value for the time period according to the following equation:

$$\text{Return of Incremental Digital Content Expenditure Value} = \frac{(\text{Channel}/\text{Region Revenue} - \text{Total Expenditure})}{\text{Total Expenditure}}$$

Figure 4:
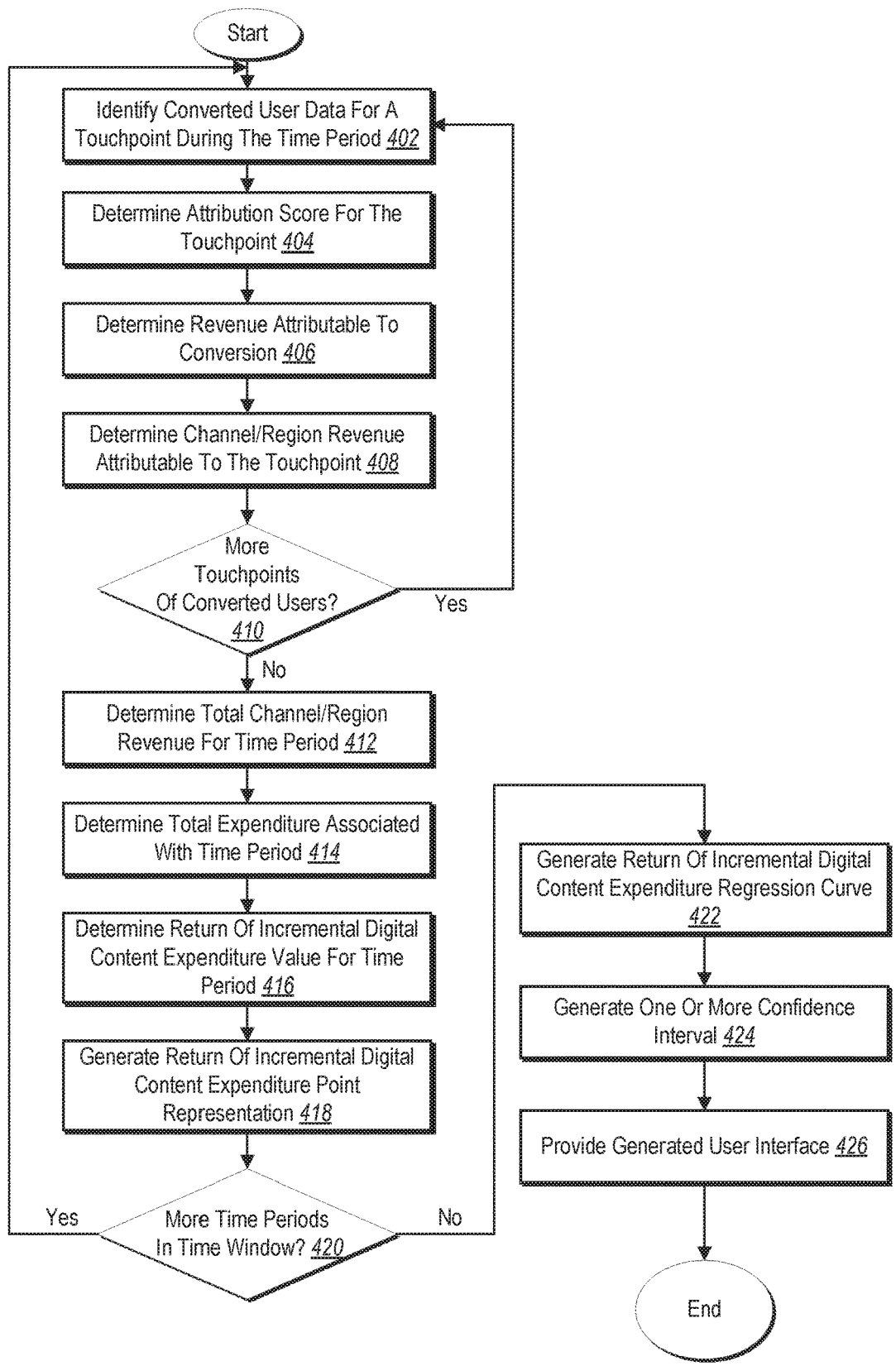
FIG. 4 illustrates a sequence diagram of generating a return of incremental digital content expenditure user interface in accordance with one or more embodiments.

The process by which the digital campaign design system 106 determines return of incremental digital content expenditure values is described in greater detail with regard to FIG. 4. For example, FIG. 4 illustrates a process diagram illustrating a series of acts by which the digital campaign design system 106 determines return of incremental digital content expenditure values for periods of time across a time window in association with a multi-channel, multi-regional digital content campaign.

As shown in FIG. 4, the digital campaign design system 106 performs an act 402 of identifying converted user data for a touchpoint associated with a channel and region combination during a time period associated with the digital content campaign. For example, the digital campaign design system 106 can identify data associated with the digital content campaign in the specified channel and region for the specified time period (e.g., the time period may be a fiscal week). In one or more embodiments, the digital campaign design system 106 narrows the identified data for the specified time period to only information associated with a touchpoint of a converted user (e.g., a touchpoint corresponding to a user associated with a conversion specified by the parameters of the digital content campaign). The digital campaign design system 106 can identify information associated with a touchpoint of a converted user including the user's unique user ID, the touchpoint date, the conversion date, the time period, the region, and the channel.

Moreover, in one or more embodiments, the digital campaign design system 106 gathers data from a variety of data sources based on a user's user ID. For example, the digital campaign design system 106 can access multiple data repositories for multiple digital content campaigns, multiple channels, and/or multiple regions. The digital campaign design system 106 can align data from multiple data sources utilizing a common user ID to identify all touchpoints corresponding to a converted user.

As shown in FIG. 4, the digital campaign design system 106 performs an act 404 of determining an attribution score for the touchpoint. For example, as discussed above, in one or more embodiments, the digital campaign design system 106 utilizes a trained attribution model to determine the attribution score associated with a particular touchpoint of a converted user. In at least one embodiment, the digital campaign design system 106 provides the identified information associated with touchpoints of a converted user to the attribution model as input. The digital campaign design system 106 then receives the attribution score for the touchpoint of the converted user as the output of the attribution model. In one or more embodiments, the attribution model outputs an attribution score that is a value between zero and one.

In one or more embodiments, the digital campaign design system 106 generates training data for the attribution model based on observed touchpoint interactions associated with a digital content campaign. For example, the digital campaign design system 106 may generate conversion paths representing tokenized touchpoint parameters. The resulting conversion paths may be positive (e.g., indicating a conversion) or negative (e.g., indicating failure to convert). By utilizing the observed conversion paths to train the attribution model, the digital campaign design system 106 can expect model outputs that reflect how a particular touchpoint interaction effects the revenue attributable to a particular conversion.

For instance, in one or more embodiments, the digital campaign design system 106 trains a touchpoint attribution attention neural network (that includes an encoding layer, an LSTM layer, and a touchpoint attention layer) based on training touchpoint paths. Specifically, digital campaign design system 106 trains the touchpoint attribution attention neural network utilizing a time-decay parameter and a jointly trained user bias control machine-learning model. In this manner, the digital campaign design system can generate and utilize a touchpoint attribution attention neural network to efficiently and accurately generate accurate touchpoint attributions. For example, in one or more embodiments, the digital campaign design system 106 utilizes the attribution models described in U.S. patent application Ser. No. 15/454,799 and U.S. patent application Ser. No. 15/917,052, the entirety of which are incorporated herein by reference.

As further illustrated in FIG. 4, the digital campaign design system 106 performs an act 406 of determining a revenue amount attributable to the conversion associated with the touchpoint of the converted user. For example, in one or more embodiments, the revenue amount attributable to a conversion depends on the type of conversion. For instance, if the specified conversion is the purchase of a particular item, the revenue amount attributable to the conversion is the purchase price of the particular item. If the specified conversion is registering for a yearly subscription, the revenue amount attributable to the conversion is the cost of the yearly subscription (or a portion of the yearly subscription attributable to a particular time period). For other conversions (e.g., a page land, a link click, a video view), the revenue amount attributable to the conversion can be an amount manually specified by the publisher of the digital content campaign.

Upon determining the attribution score for the touchpoint of the converted user (e.g., in the act 404) and the revenue amount attributable to the conversion associated with the touchpoint of the converted user (e.g., in the act 406), the digital campaign design system 106 performs an act 408 of determining the channel/region revenue attributable to the touchpoint of the converted user. For example, in at least one embodiment, the digital campaign design system 106 determines the channel-region revenue attributable to the touchpoint of the converted user by multiplying the revenue amount by the attribution score. The resulting channel/region revenue amount reflects the value of the touchpoint relative to the digital content campaign during the time period within the specified channel and region.

As shown in FIG. 4, the digital campaign design system 106 performs the acts 402-408 for a single touchpoint of a converted user (e.g., a single row in the data repository 202 illustrated in FIG. 2). Accordingly, after determining the channel-region revenue attributable to the touchpoint of the converted user (e.g., in the act 408), the digital campaign design system 106 performs the act 410 of determining whether there are additional touchpoints of converted users in the data associated with the time period for the digital content campaign (e.g., whether there are additional rows in the data repository 202 associated with the specified channel and region). If there are additional touchpoints of converted users (e.g., "Yes"), the digital campaign design system 106 again performs the act 402 and identifies the converted user data for the additional touchpoint. The digital campaign design system 106 then proceeds through the acts 404, 406, and 408 utilizing the identified information related to the additional touchpoint.

If the digital campaign design system 106 determines there are no additional touchpoints of converted users associated with the time period for the digital content campaign in the specified channel and region (e.g., "No"), the digital campaign design system 106 performs the act 412 of determining a total channel-region revenue for the time period in association with the digital content campaign. In one or more embodiments, the digital campaign design system 106 determines the total channel-region revenue for the time period by summing the channel-region revenue amounts attributable to each touchpoint of each converted user (e.g., as determined in act 408).

After determining the total channel-region revenue for the time period, the digital campaign design system 106 performs an act 414 of determining a total expenditure associated with the time period for the digital content campaign in the specified channel and region. For example, in one or more embodiments, the digital campaign design system 106 determines the total expenditure as the total amount of funds expended by the publisher in connection with the digital content campaign during the time period in the specified channel and region. For instance, in one example, the total expenditure includes bid amounts in connection with keyword auctions held during the time period in association with the specified channel and region.

With the determined total channel-region revenue and total expenditure associated with the time period in the specified channel and region, the digital campaign design system 106 can perform an act 416 of determining a return of incremental digital content expenditure value for the time period in association with the digital content campaign in the specified channel and region. For example, in at least one embodiment, the digital campaign design system 106 determines the return of incremental digital content expenditure value as the quantity of the total channel-region revenue minus the total expenditure divided by the total expenditure.

After determining the return of incremental digital content expenditure value for the time period (e.g., in the act 416), the digital campaign design system 106 performs an act 418 of generating a return of incremental digital content expenditure point representation associated with the return of incremental digital content expenditure value. For example, in at least one embodiment, the digital campaign design system 106 generates a return of incremental digital content expenditure point representation as a point on a graph within a user interface for display to a publisher computing device. More particularly, the digital campaign design system 106 positions the point representation within the graph at an x-coordinate corresponding to the total expenditure for the time period in the specified channel and region, and a y-coordinate corresponding to the return of incremental digital content expenditure value for the time period in the specified channel and region.

As shown in FIG. 4, the digital campaign design system 106 also performs an act 420 of determining whether there are more time periods within the time window represented among the historical digital content campaign data associated with the specified channel and region. For example, if each time period is a fiscal week in a fiscal year, the digital campaign design system 106 can determine whether additional fiscal weeks are represented among the historical digital content campaign data. If data associated with an additional time period is present (e.g., "Yes"), the digital campaign design system 106 moves back to the act 402 and begins the process of determining the return of incremental digital content expenditure value for the additional time period in the specified channel and region.

If data associated with an additional time period is not present (e.g., "No"), the digital campaign design system 106 has successfully determined return of incremental digital content expenditure values for each time period in the time window. Additionally, the digital campaign design system 106 has generated point representations with the graph in association with each return of incremental digital content expenditure value.

In one or more embodiments, as shown in FIG. 4, after generating all the return of incremental digital content expenditure point representations associated with a digital content campaign associated with a channel and region combination during a time window, the digital campaign design system 106 can further perform an act 422 of generating a return of incremental digital content expenditure regression curve within the user interface for display to the publisher computing device. For example, in one or more embodiments, the digital campaign design system 106 generates the return of incremental digital content expenditure regression curve by applying a regression algorithm (e.g., non-linear or linear regression function). For instance, in at least one embodiment, the digital campaign design system 106 utilizes the "AdBudg" function to generate the return of incremental digital content expenditure regression curve. The "AdBudg" function can be represented by the following equation:

$$y = a + \frac{\beta \cdot x}{x + \rho}$$

where a is the maximum determined return of incremental digital content expenditure value (e.g., the base response), β is the difference between the maximum determined return of incremental digital content expenditure value and the minimum determined return of incremental digital content expenditure value (e.g., adjusts the height of the asymptote), x is a total expenditure value associated with a time period, ρ is a shape parameter associated with the generated return of incremental digital content expenditure point representations in the graph (e.g., alters the speed with which the curve approaches the asymptote).

Alternatively, the digital campaign design system 106 can generate the return of incremental digital content expenditure regression curve within the user interface for display to the publisher device in response to a linear regression based on return of incremental digital content expenditure values and expenditure for time periods prior to a current time period. The digital campaign design system 106 can utilize a variety of regression algorithms to generate a return of incremental digital content expenditure regression curve.

Additionally, as shown in FIG. 4, the digital campaign design system 106 can perform an act 424 of generating one or more confidence intervals within the user interface for display to the publisher computing device. For example, the digital campaign design system 106 can generate a ninety-five percent confidence interval within the user interface based on the return of incremental digital content expenditure point representations, and their underlying return of incremental digital content expenditure values and expenditure values. In additional embodiments, the digital campaign design system 106 can generate additional confidence intervals (e.g., eighty-five percent confidence level, seventy-five percent confidence level) within the user interface in order to provide more analytical context to the user interface.

As shown in FIG. 4, the digital campaign design system 106 can perform an act 426 of providing the generated user interface for display to a publisher computing device. For example, the digital campaign design system 106 provides the user interface including the graph of return of incremental digital content expenditure point representations, the return of incremental digital content expenditure regression curve, and the one or more confidence intervals.

Although, as described above, the digital campaign design system 106 determines return of incremental digital content expenditure values associated with a digital content campaign in a channel and region during a time window, the digital campaign design system 106 can also perform broader analysis. For example, in additional embodiments, the digital campaign design system 106 can determine the return of incremental digital content expenditure value for the time period across all touchpoints of converted users (e.g., agnostic of channels and region), or across touchpoints of converted users only within a specific region (e.g., all touchpoints in the US), only within a specific channel (e.g., all paid-search touchpoints), or within additional channel-region combinations.

As just described, the digital campaign design system 106 can generate a user interface for display that includes a return of incremental digital content expenditure regression curve and point representations. Accordingly, in addition to the other disclosure herein, the acts (e.g., the acts 416-426) and algorithms discussed in relation to FIG. 4 can comprise corresponding structure for a step for generating a user interface for display comprising a return of incremental digital content expenditure regression curve and return of incremental digital content expenditure point representations.

As will be described in more detail below, the components of the digital campaign design system 106 can provide, along and/or in combination with other components, one or more user interfaces (e.g., graphical user interfaces or GUIs) for display to a publisher computing device (e.g., the publisher computing device 116, as shown in FIG. 1). In particular, the analytics application 118 on the publisher computing device 116 (e.g., as shown with reference to FIG. 1) can display one or more user interfaces generated by the digital campaign design system 106. The digital campaign design system 106 can utilize the analytics application 118 to allow the publisher (e.g., the publisher 120) of the publisher computing device 116 to interact with a collection of display elements within one or more user interfaces for a variety of purposes. FIGS. 5A-7 and the description that follows illustrate various example embodiments of user interfaces that are used to describe various features of the digital campaign design system 106.

Figure 5A:
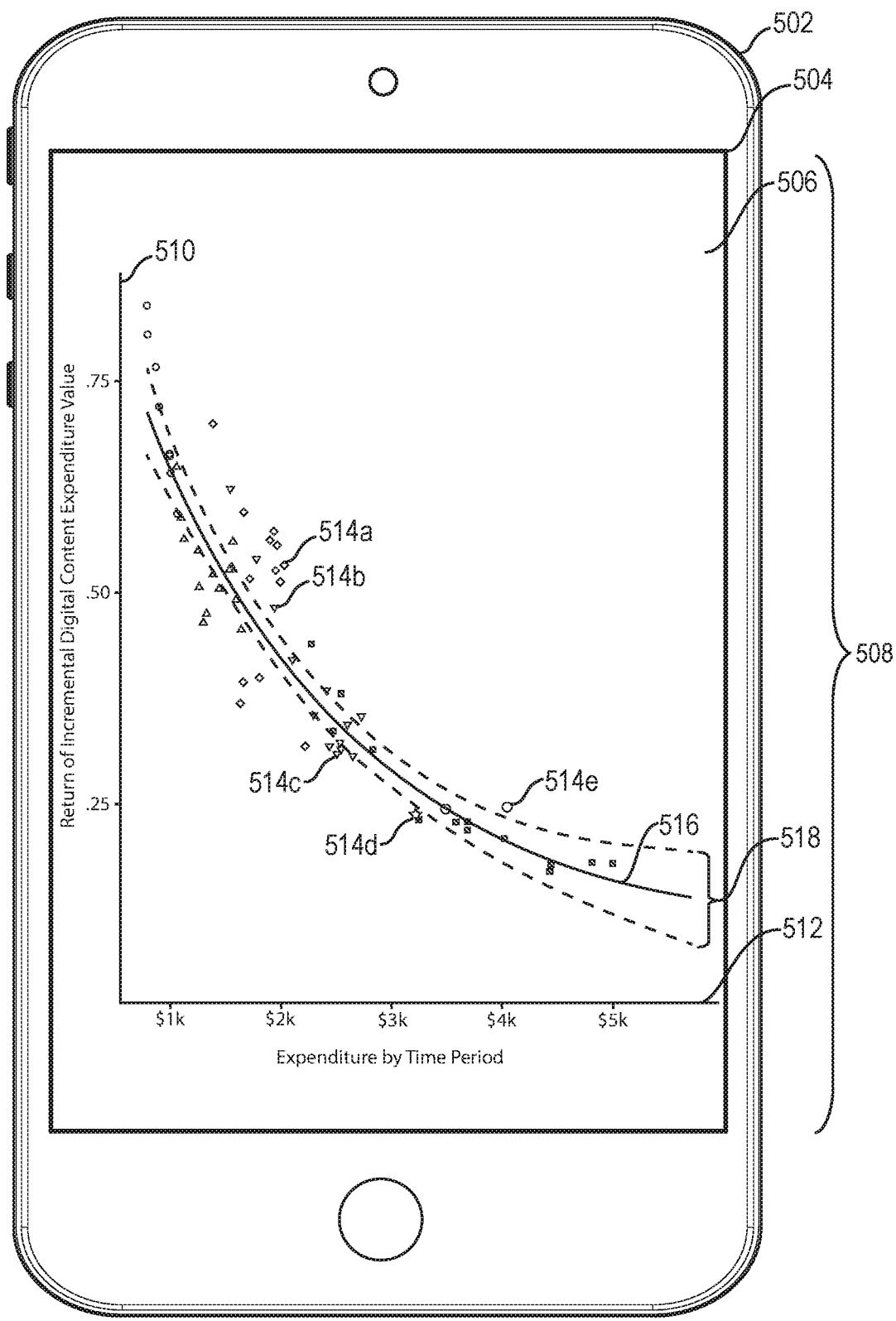
FIGS. 5A and 5B illustrate example embodiments of a return of incremental digital content expenditure user interface provided to a publisher computing device in accordance with one or more embodiments.

FIG. 5A illustrates the digital campaign design system 106 providing a return of incremental digital content expenditure user interface 506 on a touch screen display 504 of a publisher computing device 502 (e.g., via an analytics application such as the analytics application 118 installed on the publisher computing device 116 in FIG. 1). In one or more embodiments, as discussed above, the digital campaign design system 106 generates the return of incremental digital content expenditure user interface 506 including the graph 508. The digital campaign design system 106 may provide the return of incremental digital content expenditure user interface 506 for display in response to receiving a request from the publisher computing device 502 specifying analysis parameters such as an identification of one or more digital content campaigns, a time window including time periods, one or more channels of interest related to the one or more digital content campaigns, and/or one or more regions of interest related to the one or more digital content campaigns.

As shown in FIG. 5A, the digital campaign design system 106 generates the graph 508 including multiple return of incremental digital content expenditure point representations 514a, 514b, 514c, 514d, 514e positioned in relation to the y-axis 510 and the x-axis 512. For example, the y-axis 510 represents return of incremental digital content expenditure values, while the x-axis 512 represents expenditure by time period. To illustrate, the digital campaign design system 106 generated the return of incremental digital content expenditure point representation 514a at a position in the graph 508 corresponding roughly to a return of incremental digital content expenditure value of 0.5 and an expenditure by time period value of $2K.

As further illustrated in FIG. 5A, in one or more embodiments, the digital campaign design system 106 configures the return of incremental digital content expenditure point representations within the graph 508 to communicate additional information related to the underlying return of incremental digital content expenditure value. For example, in one or more embodiments, the digital campaign design system 106 configures a shape of each return of incremental digital content expenditure point representation to correspond with a particular time period. To illustrate, if the time periods represented in the graph 508 are individual weeks, the digital campaign design system 106 may configure return of incremental digital content expenditure point representations associated with a first annual quarter as triangles. Similarly, the digital campaign design system 106 may configure return of incremental digital content expenditure point representations associated with a second annual quarter as squares, and so forth.

In at least one embodiment, the digital campaign design system 106 further configures a color associated with each return of incremental digital content expenditure point representation. For example, if the time periods represented in the graph 508 are weeks, the digital campaign design system 106 may configure all return of incremental digital content expenditure point representations associated with return of incremental digital content expenditure values for the year 2016 to be blue. Similarly, the digital campaign design system 106 may configure all return of incremental digital content expenditure point representations associated with return of incremental digital content expenditure values for the year 2017 to be red, and so forth.

Moreover, in one or more embodiments, the digital campaign design system 106 can modify shape and/or color with regard to return of incremental digital content point representations that are more recent in time. For example, in one or more embodiments, the digital campaign design system 106 plots return of incremental digital content point representations for the most recent quarter as black circles and point representations for the most recent week as a black star.

In additional embodiments, the digital campaign design system 106 may configure shapes and colors associated with the return of incremental digital content expenditure point representations to communicate other information instead of time periods. For example, in at least one embodiment, the digital campaign design system 106 may configure shapes of the return of incremental digital content expenditure point representations to correspond to underlying regions, and colors of the return of incremental digital content expenditure point representations to correspond to underlying channels, or vice versa. By configuring the return of incremental digital content expenditure point representations to communicate additional information in this way, the digital campaign design system 106 enables quick and easy visual comparisons of expenditure efficiencies for a digital content campaign across various parameters (e.g., across time periods, regions, channels) in a single user interface.

As further shown in FIG. 5A, the digital campaign design system 106 further generates a return of incremental digital content expenditure regression curve 516 and at least one confidence interval 518 in the graph 508. As discussed above, the digital campaign design system 106 can generate the return of incremental digital content expenditure regression curve 516 utilizing a linear or non-linear regression algorithm (e.g., utilizing the "AdBudg" function). By generating the return of incremental digital content expenditure regression curve 516 and the confidence interval 518 in the graph 508, the digital campaign design system 106 enables efficient evaluation of performance outliers among the return of incremental digital content expenditure point representations 514a-514e.

Moreover, utilizing the return of incremental digital content expenditure regression curve 516 further assists in efficient evaluation and projection of digital content campaign performance. For example, the digital campaign design system 106 can project future performance of a digital content campaign by analyzing a proposed expenditure in light of the return of incremental digital content expenditure regression curve. To illustrate, in relation to FIG. 5A, in response to a query regarding future performance of the digital content campaign with an expenditure of $5 k, the digital campaign design system 106 can project $5 k onto the return of incremental digital content expenditure regression curve and provide an indication of projected performance (i.e., a return of incremental digital content expenditure value of 0.2). Thus, the digital campaign design system 106 can project expenditure efficiency of future campaign expenditures utilizing the return of incremental digital content expenditure regression curve.

In addition, the digital campaign design system 106 can evaluate the efficiency of a digital content campaign relative to historical efficiency. For example, in response to determining return of incremental digital content expenditure values for a new week, the digital campaign design system 106 can plot a new point representation for a new time period on the graph 508 in relation to the return of incremental digital content expenditure regression curve 516. The new point representation provides an intuitive indication of the efficiency of the new time period. Indeed, if the new point representation is above the regression curve, the digital content campaign for the new time period is performing more efficiently than historical values. On the other hand, if the new point representation is below the regression curve the digital content campaign for the new time period is performing less efficiently than historical values. In this manner, the digital campaign design system 106 can indicate improvements to digital content campaigns (e.g., improvements as a result of changing campaign parameters) and allow for intuitive modifications of digital content campaigns based on historical data.

Figure 5B:
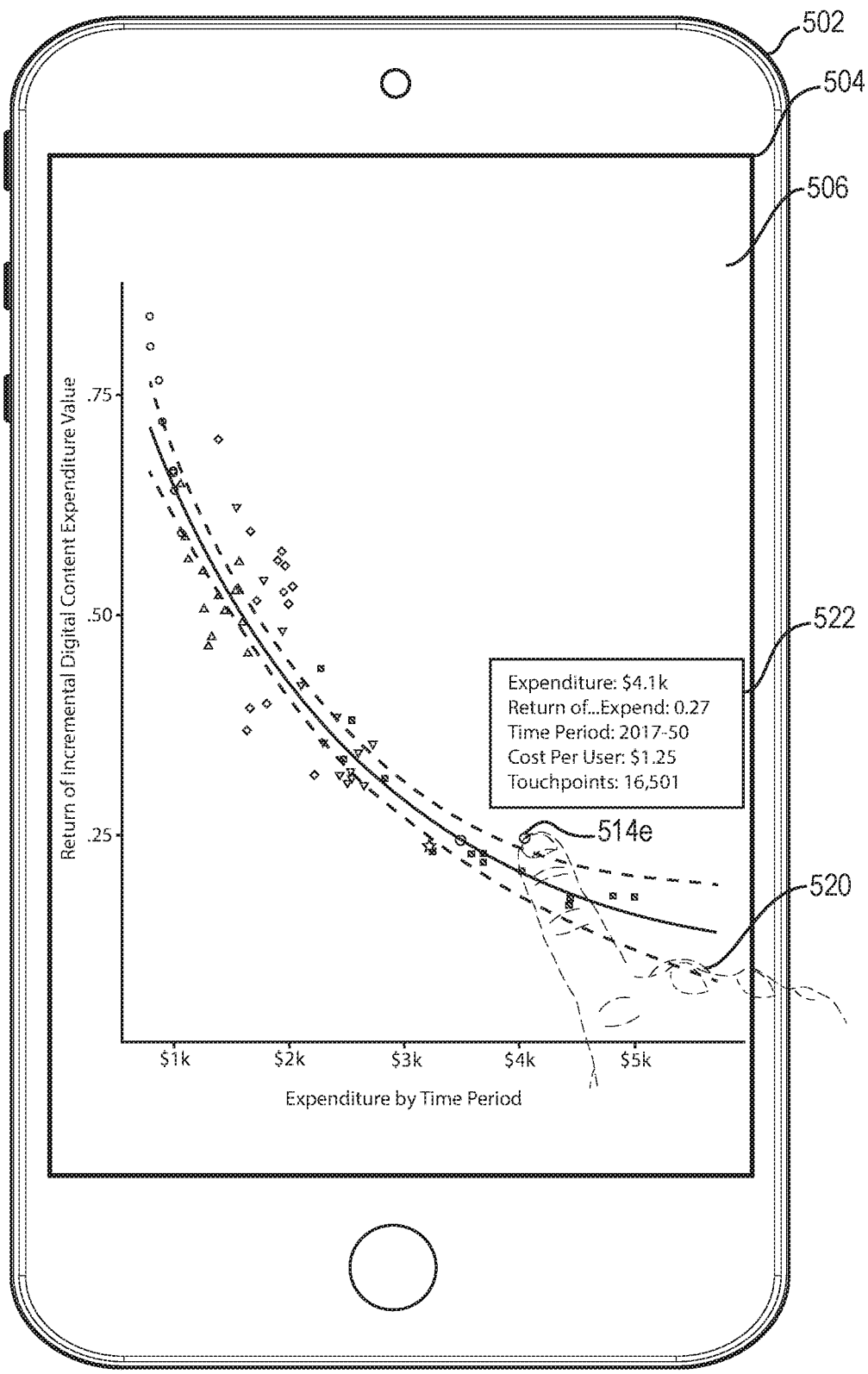

As mentioned above, in one or more embodiments, the digital campaign design system 106 generates the return of incremental digital content expenditure user interface 506 as an interactive user interface. For example, as shown in FIG. 5B, in response to a detected interaction between the publisher's finger 520 and the return of increment digital content expenditure point representation 514e, the digital campaign design system 106 can provide additional information in the pop-up window 522. For instance, the digital campaign design system 106 can generate and provide the pop-up window 522 in response to a tap touch gesture, a press-and-hold touch gesture, a variable pressure touch gesture, or any other suitable touch gesture. Similarly, if the publisher computing device 502 does not include a touch screen display (e.g., such as the touch screen display 504), the digital campaign design system 106 can generate and provide the pop-up window 522 in response to a mouse click, a mouse hover, a stylus interaction, a keystroke, or any other suitable input.

As shown in FIG. 5B, the digital campaign design system 106 generates the pop-up window 522 including information associated with the return of incremental digital content expenditure point representation 514e, as well as information associated with the digital content campaign and time period associated with the return of incremental digital content expenditure point representation 514e. For example, as shown in FIG. 5B, the digital campaign design system 106 can generate the pop-up window 522 including a total expenditure associated with the return of incremental digital content expenditure point representation 514e (e.g., "$4.1K"), the return of incremental digital content expenditure value associated with the return of incremental digital content expenditure point representation 514e (e.g., "0.27"), the time period associated with the return of incremental digital content expenditure point representation 514e (e.g., "2017-50" or the 50th week of 2017), the cost per user in connection with the digital content campaign associated with the return of incremental digital content expenditure point representation 514e (e.g., "$1.25"), and the number of touchpoints represented by the return of incremental digital content expenditure point representation 514e (e.g., "16, 501").

In additional or alternative embodiments, the digital campaign design system 106 generates the pop-up window 522 to include additional or other information associated with the return of incremental digital content expenditure point representation 514e. Furthermore, in additional or alternative embodiments, the digital campaign design system 106 can provide this and other information associated with the return of incremental digital content expenditure point representation 514e in a different type of display structure (e.g., a separate user interface, a side bar).

Additionally, in some embodiments, the digital campaign design system 106 provides notifications in response to certain events. For example, in response to determining a return of incremental digital content expenditure value associated with the most recent week, the digital campaign design system 106 can determine that the digital content campaign expenditures are performing above or below historical performance (e.g., by comparing the value with the return of incremental digital content expenditure regression curve). For example, the digital campaign design system 106 can identify return of incremental digital content expenditure values for the most current fiscal week and compare the value with the return of incremental digital content expenditure regression curve and/or a confidence interval. If the value exceeds the curve and/or the confidence interval, the digital campaign design system 106 can determine the digital content campaign expenditures for the most recent fiscal week were more efficient than historical values. In at least one embodiment, the digital campaign design system 106 can generate and provide a notification to the publisher computing device 502 (e.g., a pop-up window, an email, an SMS text message) to that effect. In a similar manner, the digital campaign design system 106 can identify and notify with regard to time periods that are out performing or underperforming historical performance levels.

Figure 6:
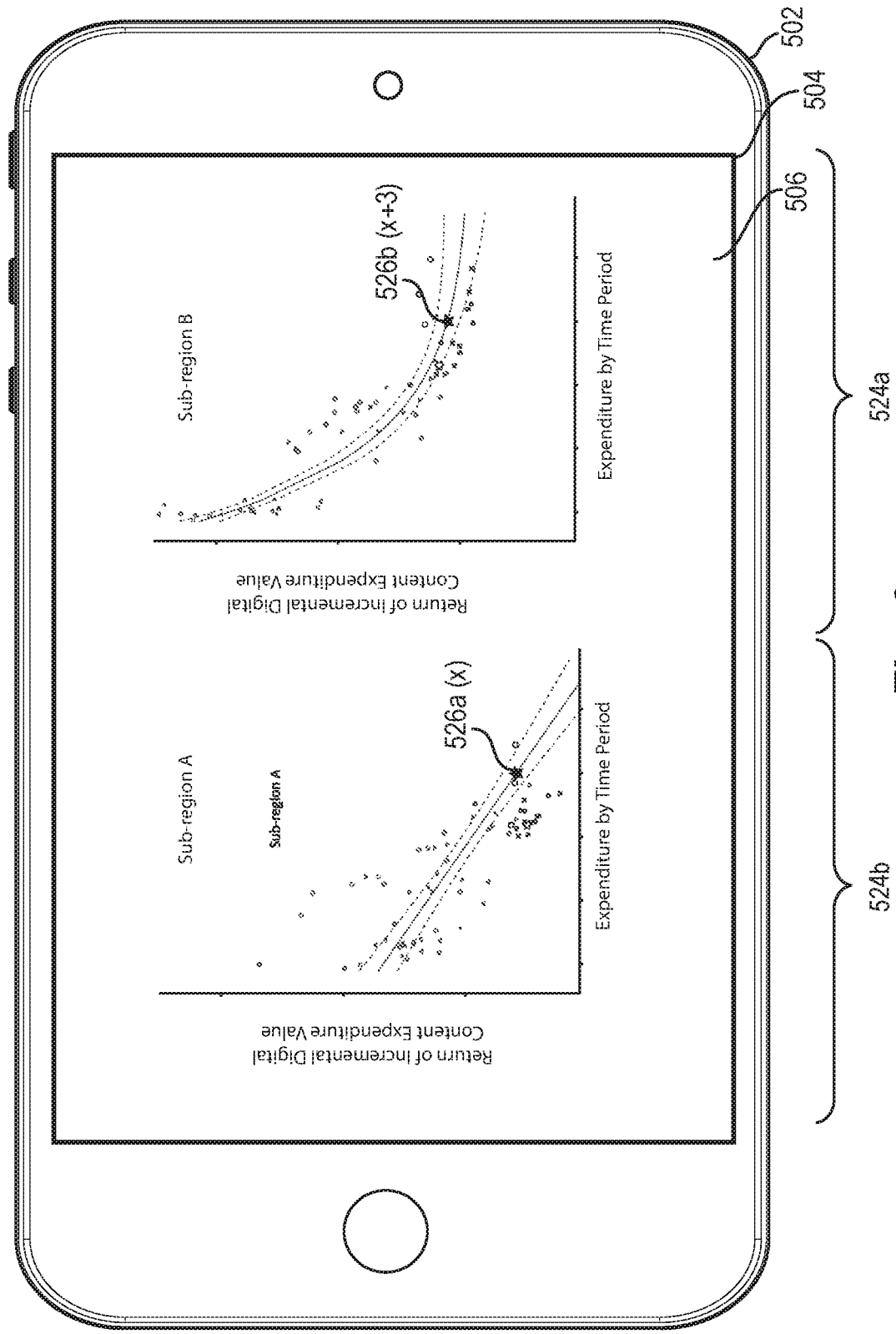
FIG. 6 illustrates an example embodiment of a return of incremental digital content expenditure user interface provided to a publisher computing device in accordance with one or more embodiments.

As mentioned above, the digital campaign design system 106 provides additional tools for analyzing digital content campaign expenditure efficiency. For example, in one embodiment, the digital campaign design system 106 provides tools to enable return of incremental digital content expenditure values between regions in association with one or more digital content campaigns. As shown in FIG. 6, in response to receiving one or more parameters from the publisher computing device 502 specifying a digital content campaign, a time window, and the sub-regions "A" and "B," the digital campaign design system 106 generates the return of incremental digital content expenditure user interface 506 including the sub-region specific graphs 524a, 524b. In one or more embodiments, the digital campaign design system 106 generates the sub-region specific graphs 524a, 524b in the same manner described above, but narrows the determination of return of incremental digital content expenditure values to touchpoints of converted users that are associated with the sub-region specified by each sub-region specific graph.

As further illustrated in FIG. 6, in at least one embodiment, the digital campaign design system 106 can provide comparison indicators 526a, 526b. For example, the digital campaign design system 106 can generate comparison indicators 526a, 526b that reflect actual (or expected) return of incremental digital content expenditure values for a particular expenditure across different regions. To illustrate, the digital campaign design system 106 can select an expenditure (e.g., based on user selection of an expenditure or based on an actual expenditure corresponding to a point representation). The digital campaign design system 106 can then generate the comparison indicator 526a to reflect the actual (or expected) return of incremental digital content expenditure value at the selected expenditure in relation to sub-region A. Similarly, the digital campaign design system 106 can generate the comparison indicator 526b to reflect the actual (or expected) return of incremental digital content expenditure value at the selected expenditure in relation to sub-region B. This allows a publisher to more easily identify relative performance at a particular expenditure value across the two graphs reflecting the two different regions.

For example, as shown in FIG. 6, the digital campaign design system 106 determines an expected return of incremental digital content expenditure value of "x" for sub-region A at a selected expenditure. Similarly, the digital campaign design system 106 determines an expected return of incremental digital content expenditure value of "x+3" for sub-region B at the selected expenditure. The digital campaign design system 106 then generates the comparison indicators 526a, 526b to illustrate the values at the respective expenditures. As shown, the comparison indicators 526a, 526b make it apparent that the digital content campaign in region "B" is more efficient (provides greater incremental return). Accordingly, the digital campaign design system 106 can assist in allocating additional funds to region "B."

Although FIG. 6 illustrates expected values (along the return of incremental digital content expenditure regression curves) for the comparison indicators 526a, 526b, the digital campaign design system 106 can utilize one or more actual values for the comparison indicators 526a, 526. For example, the digital campaign design system 106 can generate comparison indicators 526a, 526b that reflect one or more (e.g., 4) return of incremental digital content expenditure values within a particular expenditure range and/or time range. Thus, the digital campaign design system 106 can quickly indicate that, expenditures in sub-region B are more efficient than expenditures in the sub-region A. With this analytical tool, the publisher associated with the publisher computing device 502 can determine whether to shift expenditures from the lower performing sub-region A to the higher performing sub-region B.

Figure 7:
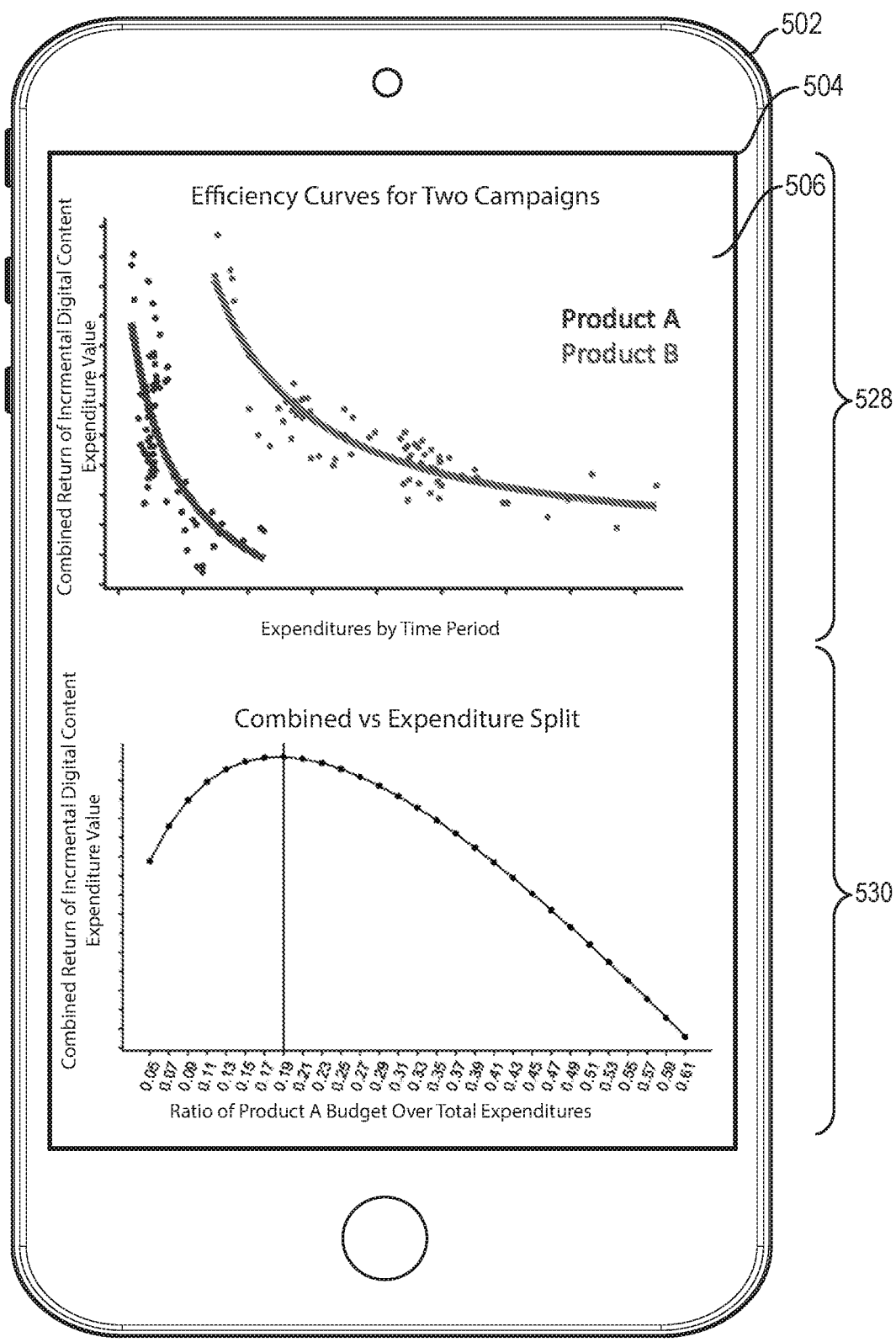
FIG. 7 illustrates an example embodiment of a return of incremental digital content expenditure user interface provided to a publisher computing device in accordance with one or more embodiments.

As mentioned, in one or more embodiments, the digital campaign design system 106 can also generate a return on incremental digital content expenditure user interface that compares multiple digital content campaigns and indicates efficient expenditure allocation between the two campaigns. For example, FIG. 7 illustrates a user interface for analyzing digital content campaign expenditure efficiency provided by the digital campaign design system 106 in accordance with one or more embodiments. In relation to FIG. 7, the digital campaign design system 105 identifies (e.g., from a publisher computing device 502) two digital content campaigns and a time window of time periods.

As shown, the digital campaign design system 106 generates the return on incremental digital content expenditure regression curves in the digital content campaign expenditure efficiency graph 528 (e.g., as described above). The digital campaign design system 106 color-codes the expenditure curves by digital content campaign for easy comparison. For example, in the embodiment illustrated in FIG. 7, the expenditure efficiency of the digital content campaign corresponding to product "A" goes down very quickly as expenditure goes up (e.g., indicating that the digital content campaign has a much smaller market).

As shown in FIG. 7, in addition to generating the digital content campaign expenditure efficiency graph 528, the digital campaign design system 106 also generates a combined expenditure efficiency versus expenditure split graph 530 in the return of incremental digital content expenditure user interface 506 on the touch screen display 504 on the publisher computing device 502. As shown, the graph 530 includes a combined return of incremental digital content expenditure curve. The combined return of incremental digital content expenditure curve illustrates the expected return of incremental digital content expenditure with respect to varying ratios of expenditure allocation between the two digital content campaigns.

The digital campaign design system 106 generates the combined return of incremental digital content expenditure curve based on the return of incremental digital content expenditure regression curves for the two digital content campaigns. For example, the digital campaign design system 106 can determine an expenditure for a first digital content campaign and a first return on digital content expenditure value from a first regression curve (for the first campaign corresponding to product "A"). The digital campaign design system 106 can then determine a corresponding expenditure allocation for the second digital content campaign and a second return on digital content expenditure value from a second regression curve (for the second campaign corresponding to product "B"). The digital campaign design system 106 can then determine a combined incremental digital content expenditure value (by adding the first return on digital content expenditure value and the second return on digital content expenditure value). The digital campaign design system 106 can repeatedly identify combined expenditure values for proposed budget splits to generate the combined return of incremental digital content expenditure curve illustrated in the graph 530.

In one or more embodiments, the combined expenditure efficiency versus expenditure split graph 530 illustrates the optimized expenditure split (e.g., the best way for the publisher to split a total expenditure budget) between the digital content campaigns. For example, the digital campaign design system 106 can generate the combined expenditure efficiency versus expenditure split graph 530 by performing a non-linear optimization on the efficiency curves included in the digital content campaign expenditure efficiency graph 528.

In at least one embodiment, the digital campaign design system 106 generates an optimized split indicator 534 in the combined expenditure efficiency versus expenditure split graph 530 at the apex of the expenditure split curve. For example, in one or more embodiments, the optimized split indicator 534 indicates the optimized expenditure split between the digital content campaign corresponding to product "A" and the digital content campaign corresponding to product "B." Although the digital content campaign expenditure efficiency graph 528 and the combined expenditure efficiency versus expenditure split graph 530 illustrated in FIG. 7 are described with reference to two digital content campaigns, in alternative or additional embodiments, the digital campaign design system 106 can generate the same graphs with reference to two products associated with the same digital content campaign, two regions associated with the same digital content campaign, or two channels associated with the same digital content campaign.

Figure 8:
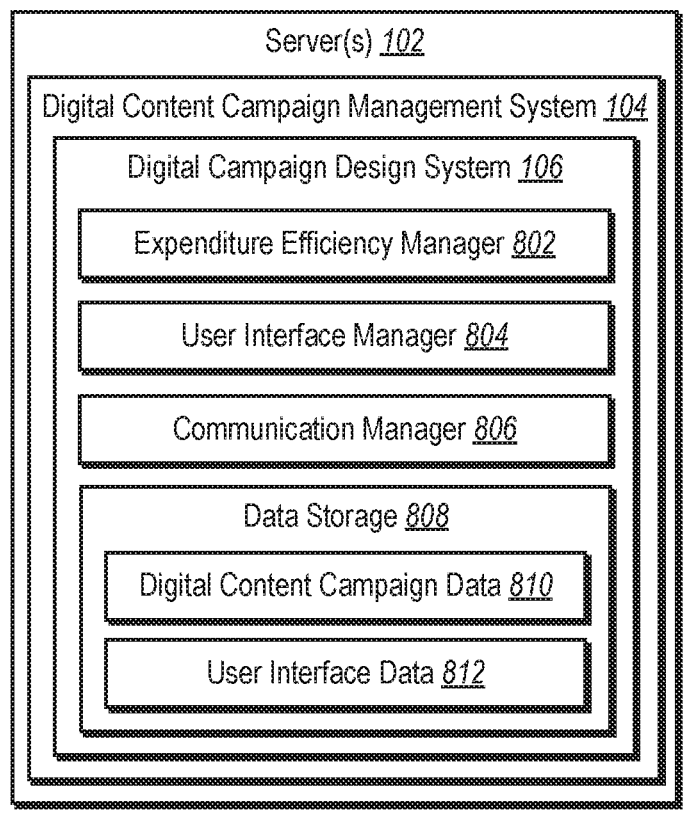
FIG. 8 illustrates a schematic diagram of the digital campaign design system in accordance with one or more embodiments.

FIG. 8 illustrates an example architecture for the digital campaign design system 106. For example, as shown in FIG. 8, the digital campaign design system 106 is maintained by the digital content campaign management system 104 on the server(s) 102. Although illustrated on the server(s) 102, as mentioned above, the digital campaign design system 106 can be implemented by another computing device (e.g., the publisher computing device 116). In one or more embodiments, the digital campaign design system 106 includes an expenditure efficiency manager 802, a user interface manager 804, a communication manager 806, and a data storage 808 including digital content campaign data 810 and user interface data 812.

Although the disclosure herein shows the components 802-812 to be separate in FIG. 8, any of the components 802-812 may be combined into fewer components, such as inter a single facility or module, or divided into more components as may serve one or more embodiments. In addition, the components 802-812 may be located on, or implemented by, one or more computing devices, such as those described below in relation to FIG. 10.

In one or more embodiments, the components 802-812 comprise software, hardware, or both. For example, the components 802-812 can comprise computing instructions stored on a non-transitory computer-readable storage medium and executable by the server(s) 102. When executed by the at least one processor, the computer-executable instructions cause the server(s) 102 to perform the methods and processes described herein. Alternatively, the components 802-812 can comprise hardware, such as a special purpose processing device to perform a certain function or group of functions. Additionally, the components 802-812 can comprise a combination of computer-executable instructions and hardware.

As mentioned above, and as shown in FIG. 8, the digital campaign design system 106 includes an expenditure efficiency manager 802. In one or more embodiments, the expenditure efficiency manager 802 tracks data associated with one or more digital content campaigns. For example, in at least one embodiment, the expenditure efficiency manager 802 tracks data associated with touchpoints of converted users in connection with a digital content campaign to generate a data repository (e.g., such as the data repository 202 illustrated in FIG. 2).

Additionally, the expenditure efficiency manager 802 trains and utilizes the attribution model. For example, as described above, the expenditure efficiency manager 802 can train an attribution model to receive converted user touchpoint data as input and to output an attribution score representing a percentage of conversion revenue that is attributable to the converted user touchpoint. In at least one embodiment, the expenditure efficiency manager 802 can periodically retrain the attribution model to ensure attribution score accuracy.

Moreover, in one or more embodiments, the expenditure efficiency manager 802 analyzes data to determine channel-region revenue associated with each touchpoint of each converted user associated with a channel and region during a time period. As described above, the expenditure efficiency manager 802 can determine channel-region revenue associated with a touchpoint of a converted user associated with a channel and region during a time period by multiplying the revenue attributable to the associated conversion by the determined attribution score for the touchpoint. It follows that the expenditure efficiency manager 802 can determine total channel-region revenue associated with the channel and region during the time period for the digital content campaign by adding together all channel-region revenues for the touchpoints of each converted user.

In one or more embodiments, the expenditure efficiency manager 802 also determines total expenditures for channel/region combinations during time periods. For example, the expenditure efficiency manager 802 can analyze expenditure data associated with the digital content campaign to determine those expenditures associated with the specified channel and region during the time period.

Furthermore, the expenditure efficiency manager 802 determines return of incremental digital content expenditure values for a specified channel and region during a time period. As described above, in at least one embodiment, the expenditure efficiency manager 802 determines the return of incremental digital content expenditure value for a specified channel and region during a time period as the quantity of the total channel/region revenue for the channel/region during the time period minus the total expenditure for the channel/region during the time period divided by the total expenditure for the channel/region during the time period.

As mentioned above, and as shown in FIG. 8, the digital campaign design system 106 includes a user interface manager 804. In one or more embodiments, the user interface manager 804 generates the return of incremental digital content expenditure user interface for display to a publisher computing device. Additionally, the user interface manager 804 generates one or more return of incremental digital content expenditure point representations corresponding to return of incremental digital content expenditure values determined by the expenditure efficiency manager 802, described above. Furthermore, also as described above, the user interface manager 804 generates the return of incremental digital content expenditure regression curve and one or more confidence intervals within the return of incremental digital content expenditure user interface.

In one or more embodiments, the user interface manager 804 also generates pop-up windows and other notifications. For example, in response to a detected interaction with a return of incremental digital content expenditure point representation within a return of incremental digital content expenditure user interface, the user interface manager 804 can generate a pop-up window including additional information associated with the return of incremental digital content expenditure point representation. Furthermore, in response to the determination that a particular return of incremental digital content expenditure point value associated with a return of incremental digital content expenditure point representation is under performing or over performing, the user interface manager 804 can generate one or more notifications including information about the return of incremental digital content expenditure value.

Moreover, the user interface manager 804 can generate additional display tools. For example, as discussed above, the user interface manager 804 can generate various sub-region specific graphs (e.g., described with reference to FIG. 6). Additionally, the user interface manager 804 can generate a digital content campaign expenditure efficiency graph comparing two or more digital content campaigns and a combined expenditure efficiency versus expenditure split graph for the two or more digital content campaigns (e.g., described with reference to FIG. 7).

As mentioned above, and as shown in FIG. 8, the digital campaign design system 106 includes a communication manager 806. In one or more embodiments, the communication manager 806 receives data from and provides data to the analytics application 118 installed on the publisher computing device 116. For example, the communication manager 806 can provide generated user interfaces, graphs, and other display elements to the analytics application 118 installed on the publisher computing device 116. In one or more embodiments, the communication manager 806 receives analytics parameters and indications of user interactions from the analytics application 118 installed on the publisher computing device 116.

Additionally, the communication manager 806 receives digital content campaign data from the third-party network server 112. For example, the communication manager 806 can receive digital content campaign data related to touchpoints, conversions, expenditures, and revenue from the third-party network server 112.

Also, as mentioned above, the digital campaign design system 106 includes a data storage 808. The data storage 808 stores and maintains digital content campaign data 810 representative of digital content campaign information, such as described herein. The data storage 808 also stores and maintains user interface data 812 representative of user interface information, such as described herein.

Figure 9:
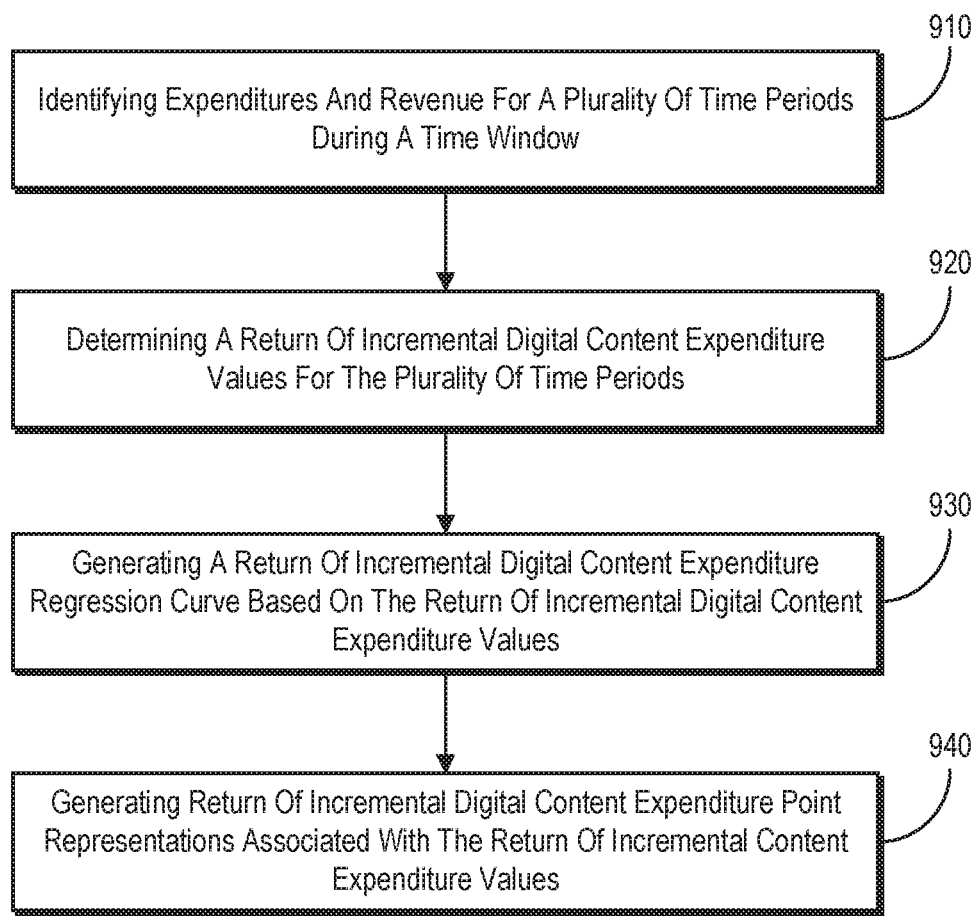
FIG. 9 illustrates a flowchart of a series of acts for generating a return of incremental digital content expenditure user interface in accordance with one or more embodiments.

Turning now to FIG. 9, this figure illustrates a flowchart of a series of acts 900 of generating a return of incremental digital content expenditure user interface in accordance with one or more embodiments described herein. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions, that when executed by one or more processors, cause a computing device to perform the acts of FIG. 9. In still further embodiments, a system can perform the acts of FIG. 9.

As shown in FIG. 9, the series of acts 900 includes an act 910 of identifying expenditures and revenue for a plurality of time periods during a time window. For example, the act 910 can involve identifying, for one or more digital content campaigns that provide digital content to users of client devices, expenditures for a plurality of time periods within a time window and revenue for the plurality of time periods within the time window. In one or more embodiments, identifying the revenue for the plurality of time periods within the time window includes identifying, for a plurality of users, channel-region revenue specific to a first digital channel and a first region corresponding to the plurality of users for a first time period of the plurality of time periods. In at least one embodiment, identifying the channel-region revenue includes: determining a conversion corresponding to a user of the plurality of users within the first time period of the plurality of time periods; identifying a revenue amount from the conversion corresponding to the user; identifying a first touchpoint by a client device of the user, and a second touchpoint by the client device of the user; and determining the channel-region revenue based on the revenue amount from the conversion, the first touchpoint, and the second touchpoint. In additional embodiments, identifying the channel-region revenue further includes: generating an attribution score based on the first touchpoint and the second touchpoint; and determining the channel-region revenue based on the revenue amount from the conversion corresponding to the user and the attribution score.

Additionally, as shown in FIG. 9, the series of acts 900 includes an act 920 of determining return of incremental digital content expenditure values for the plurality of time periods. For example, the act 920 can involve determining, for the users of the client devices corresponding to the one or more digital content campaigns, return of incremental digital content expenditure values for the plurality of time periods. In one or more embodiments, determining the return of incremental digital content expenditure values for the plurality of time periods includes, for the first time period in the time window: determining a total channel-region revenue of the one or more digital content campaigns for the first time period based on attribution scores and channel-region revenue values corresponding to the plurality of users during the first time period; and determining the return of incremental digital content expenditure value for the first time period based on the determined total revenue of the one or more digital content campaigns for the first time period and the expenditure for the first time period.

Furthermore, as shown in FIG. 9, the series of acts 900 includes an act 930 of generating a return of incremental digital content expenditure regression curve based on the return of incremental digital content expenditure values. For example, the act 930 can involve generating a user interface for display to a publisher computing device by generating a return of incremental digital content expenditure regression curve as part of a graph within the user interface based on the return of incremental digital content expenditure values for the plurality of time periods and the expenditures for the plurality of time periods. In one or more embodiments, generating the return of incremental digital content expenditure regression curve as part of the graph within the user interface includes: determining a non-linear regression based on the determined return of incremental digital content expenditure values for the plurality of time periods; and wherein generating the return of incremental digital content expenditure regression curve as part of the graph within the user interface is based on the determined non-linear regression. In at least one embodiment, generating the user interface for display further includes generating at least one confidence interval as part of the graph within the user interface corresponding to the return of incremental digital content expenditure values.

As shown in FIG. 9, the series of act 900 also includes an act 940 of generating return of incremental digital content expenditure point representations associated with the return of incremental content expenditure values. For example, the act 940 can involve further generating the user interface for display to the publisher device by generating, within the graph of the user interface, return of incremental digital content expenditure point representations corresponding to the return of incremental digital content expenditure values and to the expenditure values. In one or more embodiments, generating return of incremental digital content expenditure point representations includes: configuring a color and shape of each return of incremental digital content expenditure point representation based on the time period associated with the corresponding return of incremental digital content expenditure value; and positioning each return of incremental digital content expenditure point representation at an x-coordinate in the graph associated with the corresponding return of incremental digital content expenditure value and a y-coordinate in the graph associated with the corresponding expenditure.

In one or more embodiments, the series of acts 900 also includes an act of receiving an indication of a user interaction with a return of incremental digital content expenditure point representation in the user interface displayed to the publisher computing device. Additionally, the series of acts 900 can include an act of, in response to receiving the indication of the user interaction, display, in a pop-up window corresponding to the return of incremental digital content expenditure point representation, additional information associated with the return of incremental digital content expenditure value corresponding to the return of incremental digital content expenditure point representation. For example, the additional information associated with the return of incremental digital content expenditure value corresponding to the return of incremental digital content expenditure point representation can include one or more of: a total expenditure amount associated with the return of incremental digital content expenditure value corresponding to the return of incremental digital content expenditure point representation, a total expenditure amount associated with each user corresponding to the return of incremental digital content expenditure value, or a description of the time period corresponding to the return of incremental digital content expenditure value.

Additionally, in at least one embodiment, the series of acts 900 can include acts of: identifying an additional return of incremental digital content expenditure curve associated with an additional digital content campaign; generating a combined return of incremental digital content expenditure curve based on the additional return of incremental digital content expenditure curve associated with the additional digital content campaign, the return of incremental digital content expenditure curve associated with the one or more digital content campaigns, and budget split values, wherein the apex of the combined expenditure curve represents the optimized budget split between the one or more digital content campaigns and the new digital content campaigns; and generating an additional user interface for display to the publisher computing device comprising the combined return of incremental digital content expenditure curve.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
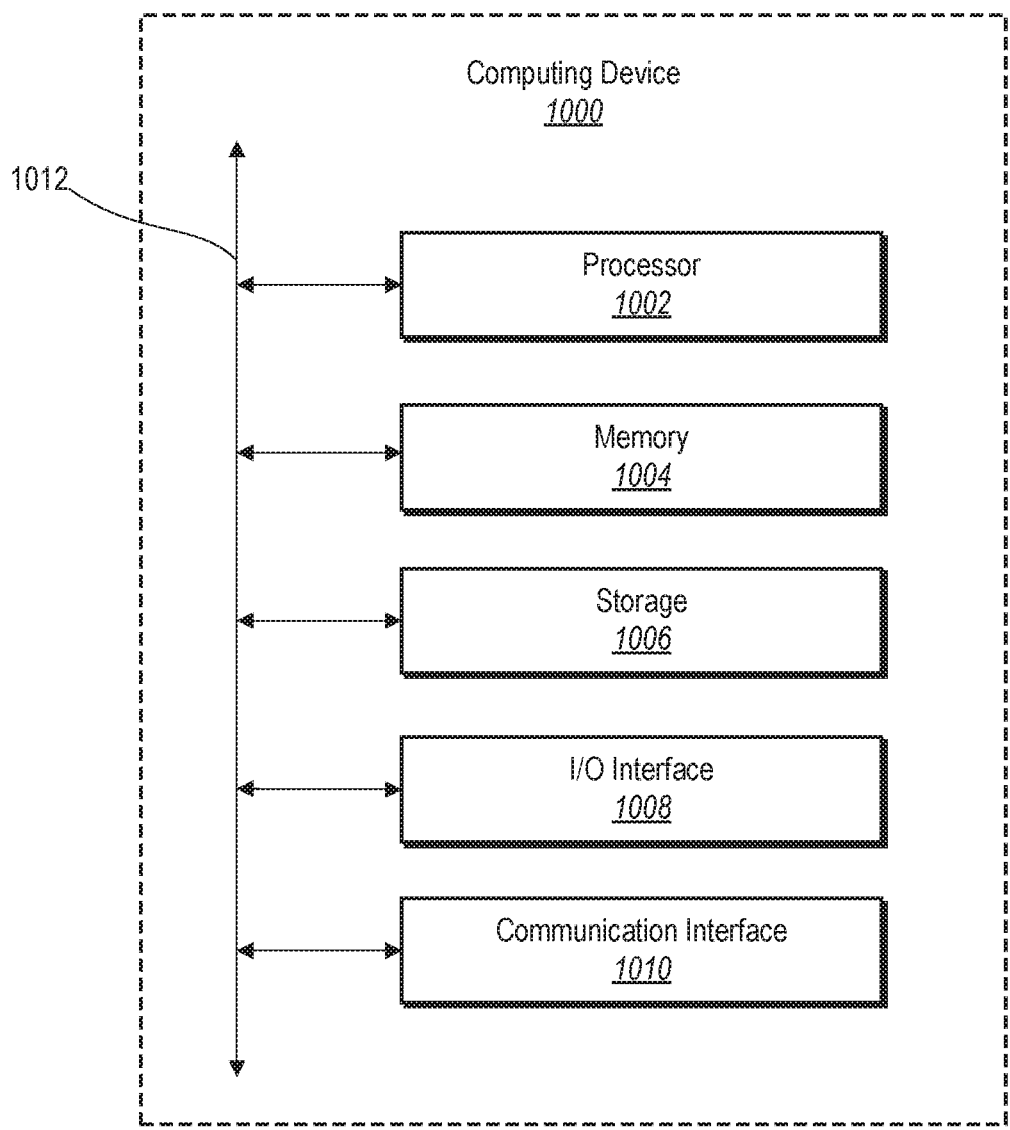
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the digital campaign design system 106 can be implanted on implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1004 may be internal or distributed memory. In one or more embodiments, the memory 1004 stores or comprises the data storage.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices. In one or more embodiments, the storage device 1006 stores or comprise the data storage.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps or acts or the steps or acts may be performed in differing orders. Additionally, the steps or acts described herein may be repeated or performed in parallel with one another or in parallel with different instances of the same or similar steps or acts. The scope of the present application is, therefore, indicated by the appended claims rather than by the foregoing description. All changes that come within the meaning and range of equivalency of the claims are to be embraced within their scope.

I claim:

1. In a digital medium environment for designing and executing digital content campaigns, a method for generating and providing for display efficient return of incremental digital content expenditure user interfaces for publisher computing devices comprising:

identifying, for one or more digital content campaigns that provide digital content to users of client devices, expenditures for a plurality of time periods within a time window and revenue for the plurality of time periods within the time window;

determining, for each digital channel and region combination associated with the one or more digital content campaigns during each of the plurality of time periods, a difference between an expenditure associated with the digital channel and region combination and a revenue attributable to the digital channel and region combination per unit of expenditure for the time period;

generating, for the users of the client devices corresponding to the one or more digital content campaigns, return of incremental digital content expenditure values utilizing the determined differences for the plurality of time periods;

generating, utilizing a regression model, a return of incremental digital content expenditure regression curve from a base return of incremental digital content expenditure value, the expenditures for the plurality of time periods, and a difference range of the return of incremental digital content expenditure values;

providing, for display via a publisher computing device, a user interface comprising a graph illustrating the return of incremental digital content expenditure regression curve and return of incremental digital content expenditure point representations corresponding to the return of incremental digital content expenditure values and the expenditures for the plurality of time periods; and in response to a user input gesture corresponding to an incremental digital content expenditure point representation of the graph via the user interface, modifying, via the publisher computing device, the graph by generating a pop-up window including a total expenditure associated with the return of incremental digital content expenditure point representation, a return of incremental digital content expenditure value associated with the return of incremental digital content expenditure point representation, a time period associated with the return of incremental digital content expenditure point representation, a cost per user in connection with a digital content campaign associated with the return of incremental digital content expenditure point representation, and a number of touchpoints represented by the return of incremental digital content expenditure point representation.

2. The method as recited in claim 1, further comprising generating an additional return of incremental digital content expenditure regression curve for an additional digital content campaign utilizing the regression model.

3. The method as recited in claim 2, further comprising providing for display, via the user interface of the publisher computing device, the additional return of incremental digital content expenditure regression curve for the additional digital content campaign with the graph comprising the return of incremental digital content expenditure regression curve and the return of incremental digital content expenditure point representations.

4. The method as recited in claim 2, further comprising generating a combined expenditure efficiency versus expenditure split graph from the return of incremental digital content expenditure regression curve for the one or more digital content campaigns and the additional return of incremental digital content expenditure regression curve for the additional digital content campaign.

5. The method as recited in claim 4, further comprising providing the combined expenditure efficiency versus expenditure split graph for display via the user interface.

6. A non-transitory computer-readable storage medium storing instructions thereon that, when executed by at least one processor, cause the at least one processor to:
- identify, for one or more digital content campaigns that provide digital content to users of client devices, expenditures for a plurality of time periods within a time window and revenue for the plurality of time periods within the time window;
- determine, for each digital channel and region combination associated with the one or more digital content campaigns during each of the plurality of time periods, a difference between an expenditure associated with the digital channel and region combination and revenue attributable to the digital channel and region combination per unit of expenditure for the time period;
- generate, for the users of the client devices corresponding to the one or more digital content campaigns, return of incremental digital content expenditure values utilizing the determined differences for the plurality of time periods;
- generate, utilizing a regression model, a return of incremental digital content expenditure regression curve from a base return of incremental digital content expenditure value, the expenditures for the plurality of time periods, and a difference range of the return of incremental digital content expenditure values;
- provide, for display via a publisher computing device, a user interface comprising a graph illustrating the return of incremental digital content expenditure regression curve and return of incremental digital content expenditure point representations corresponding to the return of incremental digital content expenditure values and to the expenditures for the plurality of time periods; and
- in response to a user input gesture corresponding to an incremental digital content expenditure point representation of the graph via the user interface, modify the graph by generating a pop-up window including a total expenditure associated with the return of incremental digital content expenditure point representation, a return of incremental digital content expenditure value associated with the return of incremental digital content expenditure point representation, a time period associated with the return of incremental digital content expenditure point representation, a cost per user in connection with a digital content campaign associated with the return of incremental digital content expenditure point representation, and a number of touchpoints represented by the return of incremental digital content expenditure point representation.

7. The non-transitory computer-readable storage medium as recited in claim 6, further comprising instructions that, when executed by the at least one processor, cause the at least one processor to identify the revenue for the plurality of time periods within the time window by identifying, for a plurality of users, channel-region revenue specific to a first digital channel and region combination corresponding to the plurality of users for a first time period of the plurality of time periods within the time window.

8. The non-transitory computer-readable storage medium as recited in claim 7, wherein identifying the channel-region revenue comprises:
- determining a conversion corresponding to a user of the plurality of users within the first time period of the plurality of time periods;
- identifying a revenue amount from the conversion corresponding to the user;
- identifying a first touchpoint by a client device of the user, and a second touchpoint by the client device of the user; and
- determining the channel-region revenue based on the revenue amount from the conversion, the first touchpoint, and the second touchpoint.

9. The non-transitory computer-readable storage medium as recited in claim 8, wherein identifying the channel-region revenue further comprises:
- generating an attribution score based on the first touchpoint and the second touchpoint; and
- determining the channel-region revenue based on the revenue amount from the conversion corresponding to the user and the attribution score.

10. The non-transitory computer-readable storage medium as recited in claim 9, further comprising instructions that, when executed by the at least one processor, cause the at least one processor to further generate the return of incremental digital content expenditure values for the plurality of time periods by, for each digital channel and region combination associated with the one or more digital content campaigns during the first time period within the time window:
- determining the revenue attributable to the digital channel and region combination as a total channel-region revenue of the one or more digital content campaigns for the first time period based on attribution scores and channel-region revenue values corresponding to the plurality of users during the first time period; and
- determining the return of incremental digital content expenditure value for the first time period as a difference between the determined total channel-region revenue of the one or more digital content campaigns for the first time period and the expenditure associated with the digital channel and region combination during the first time period, divided by unit of expenditure for the first time period.

11. The non-transitory computer-readable storage medium as recited in claim 10, further comprising instructions that, when executed by the at least one processor, cause the at least one processor to generate the return of incremental digital content expenditure regression curve by determining a non-linear regression utilizing the regression model.

12. The non-transitory computer-readable storage medium as recited in claim 11, further comprising computer-executable instructions that, when executed by the at least one processor, cause the at least one processor to provide, for display via the user interface, a confidence interval for the return of incremental digital content expenditure regression curve as part of the graph.

13. The non-transitory computer-readable storage medium as recited in claim 12, further comprising instructions that, when executed by the at least one processor, cause the at least one processor to generate the return of incremental digital content expenditure point representations by:
- configuring a color and shape of each return of incremental digital content expenditure point representation based on the time period associated with the corresponding return of incremental digital content expenditure value; and
- positioning each return of incremental digital content expenditure point representation at an x-coordinate in the graph associated with the corresponding return of incremental digital content expenditure value and a y-coordinate in the graph associated with the corresponding expenditure.

14. The non-transitory computer-readable storage medium as recited in claim 6, further comprising computer-executable instructions that, when executed by the at least one processor, cause the at least one processor to generate an additional return of incremental digital content expenditure regression curve utilizing the regression model.

15. The non-transitory computer-readable storage medium as recited in claim 14, further comprising computer-executable instructions that, when executed by the at least one processor, cause the at least one processor to, provide for display, via the user interface of the publisher computing device, the additional return of incremental digital content expenditure regression curve with the graph comprising the return of incremental digital content expenditure regression curve and the return of incremental digital content expenditure point representations.

16. The non-transitory computer-readable storage medium as recited in claim 15, further comprising:
- generating a combined expenditure efficiency versus expenditure split graph from the return of incremental digital content expenditure regression curve for the one or more digital content campaigns and the additional return of incremental digital content expenditure regression curve for the additional digital content campaign; and
- providing the combined expenditure efficiency versus expenditure split graph for display via the user interface.

17. A system comprising:
- at least one processor; and
- at least one non-transitory computer-readable storage medium storing instructions thereon that, when executed by the at least one processor, cause the system to:
- identify, for one or more digital content campaigns that provide digital content to users of client devices, expenditures for a plurality of time periods within a time window and revenue for the plurality of time periods within the time window;
- determine, for each digital channel and region combination associated with the one or more digital content campaigns during each of the plurality of time periods, a difference between an expenditure associated with the digital channel and region combination and a revenue attributable to the digital channel and region combination per unit of expenditure for the time period;
- generate, for the users of the client devices corresponding to the one or more digital content campaigns, return of incremental digital content expenditure values utilizing the determined differences for the plurality of time periods;
- generate, utilizing a regression model, a return of incremental digital content expenditure regression curve from a base return of incremental digital content expenditure value, the expenditures for the plurality of time periods, and a difference range of the return of incremental digital content expenditure values;
- provide, for display via a publisher computing device, a user interface comprising a graph illustrating the return of incremental digital content expenditure regression curve and return of incremental digital content expenditure point representations corresponding to the return of incremental digital content expenditure values and the expenditures for the plurality of time periods; and
- in response to a user input gesture corresponding to an incremental digital content expenditure point representation of the graph via the user interface, modify the graph by generating a pop-up window including a total expenditure associated with the return of incremental digital content expenditure point representation, a return of incremental digital content expenditure value associated with the return of incremental digital content expenditure point representation, a time period associated with the return of incremental digital content expenditure point representation, a cost per user in connection with a digital content campaign associated with the return of incremental digital content expenditure point representation, and a number of touchpoints represented by the return of incremental digital content expenditure point representation.

18. The system as recited in claim 17, further comprising instructions that, when executed by the at least one processor, cause the system to:
- generate, utilizing the regression model, an additional return of incremental digital content expenditure regression curve for an additional campaign; and
- generate, from the return of incremental digital content expenditure regression curve and the additional return of incremental digital content expenditure regression curve, a combined expenditure efficiency versus expenditure split graph illustrating combined return of incremental digital content expenditure values.

19. The system as recited in claim 18, further comprising instructions that, when executed by the at least one processor, cause the system to provide, for display via the user interface, the combined expenditure efficiency versus expenditure split graph.

20. The system as recited in claim 19, further comprising instructions that, when executed by the at least one processor, cause the system to provide, for display via the user interface, an optimized split indicator at an apex of the combined expenditure efficiency versus expenditure split graph.

* * * * *